(12) United States Patent
Condeixa et al.

(10) Patent No.: US 10,966,070 B2
(45) Date of Patent: Mar. 30, 2021

(54) SYSTEMS AND METHODS FOR MANAGING DATA WITH HETEROGENEOUS MULTI-PATHS AND MULTI-NETWORKS IN AN INTERNET OF MOVING THINGS

(71) Applicant: Veniam, Inc., Mountain View, CA (US)

(72) Inventors: Tiago Silvestre Condeixa, Aveiro (PT); Diogo Miguel Augusto Lopes, Aveiro (PT); Ricardo Jorge Magalhães de Matos, Oporto (PT)

(73) Assignee: VENIAM, INC., Mountain View, CA (US)

( * ) Notice: Subject to any disclaimer, the term of this patent is extended or adjusted under 35 U.S.C. 154(b) by 204 days.

(21) Appl. No.: 15/847,264

(22) Filed: Dec. 19, 2017

(65) Prior Publication Data

US 2018/0220283 A1    Aug. 2, 2018

Related U.S. Application Data

(60) Provisional application No. 62/452,047, filed on Jan. 30, 2017.

(51) Int. Cl.
| | |
|---|---|
| *H04W 4/44* | (2018.01) |
| *H04W 4/46* | (2018.01) |
| *H04L 29/08* | (2006.01) |
| *H04W 28/02* | (2009.01) |
| *H04L 29/06* | (2006.01) |

(Continued)

(52) U.S. Cl.
CPC .............. *H04W 4/44* (2018.02); *H04L 67/12* (2013.01); *H04L 69/22* (2013.01); *H04W 4/46* (2018.02); *H04W 28/021* (2013.01); *H04W 28/0215* (2013.01); *H04L 43/06* (2013.01); *H04L 45/08* (2013.01); *H04L 67/10* (2013.01); *H04W 4/025* (2013.01); *H04W 4/029* (2018.02); *H04W 4/38* (2018.02); *H04W 4/40* (2018.02); *H04W 4/70* (2018.02); *Y02D 30/70* (2020.08)

(58) Field of Classification Search
CPC ......... H04L 43/06; H04L 45/08; H04L 67/10; H04L 67/12; H04W 4/38; H04W 4/44; H04W 4/46
See application file for complete search history.

(56) References Cited

U.S. PATENT DOCUMENTS 9,537,914 B1 *   1/2017  Dong ................... H04L 65/4069
2013/0329598 A1 * 12/2013  DiFazio ............. H04W 64/003
                                                                370/254

(Continued)

OTHER PUBLICATIONS

Orozco, Ana Maria; Michoud, Roger; Llano, Gonzalo Routing Protocols simulation for Efficiency Applications in Vehicular Environments Sistemas & Telemática, vol. 11, No. 27, Oct.-Dec. 2013, pp. 27-42 Universidad ICESI (Year: 2013).*

*Primary Examiner* — June Y Sison
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things).

24 Claims, 15 Drawing Sheets

(51) Int. Cl.
*H04L 12/26* (2006.01)
*H04L 12/751* (2013.01)
*H04W 4/38* (2018.01)
*H04W 4/40* (2018.01)
*H04W 4/02* (2018.01)
*H04W 4/029* (2018.01)
*H04W 4/70* (2018.01)

(56) References Cited

U.S. PATENT DOCUMENTS

| | | | |
|---|---|---|---|
| 2014/0204740 A1* | 7/2014 | Tokutsu | H04L 47/2441 370/230 |
| 2015/0264554 A1* | 9/2015 | Addepalli | H04W 72/0406 370/328 |
| 2019/0090174 A1 | 3/2019 | Rocci et al. | |

* cited by examiner

700

SYSTEMS AND METHODS FOR MANAGING DATA WITH HETEROGENEOUS MULTI-PATHS AND MULTI-NETWORKS IN AN INTERNET OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/452,047, filed on Jan. 30, 2017, and titled "Systems and Methods for Managing Data with Heterogeneous Multi-Paths and Multi-Networks in an Internet of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
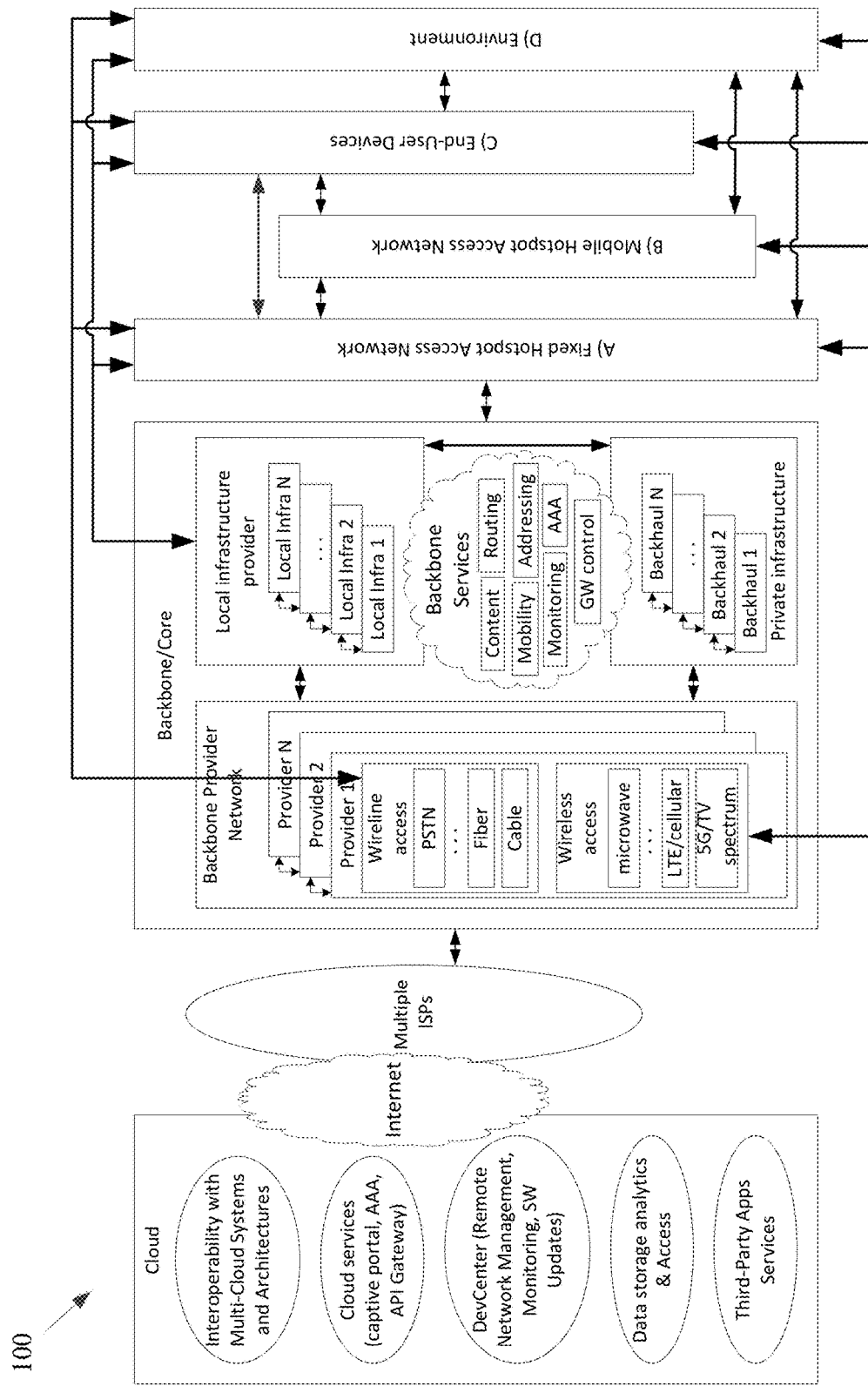
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
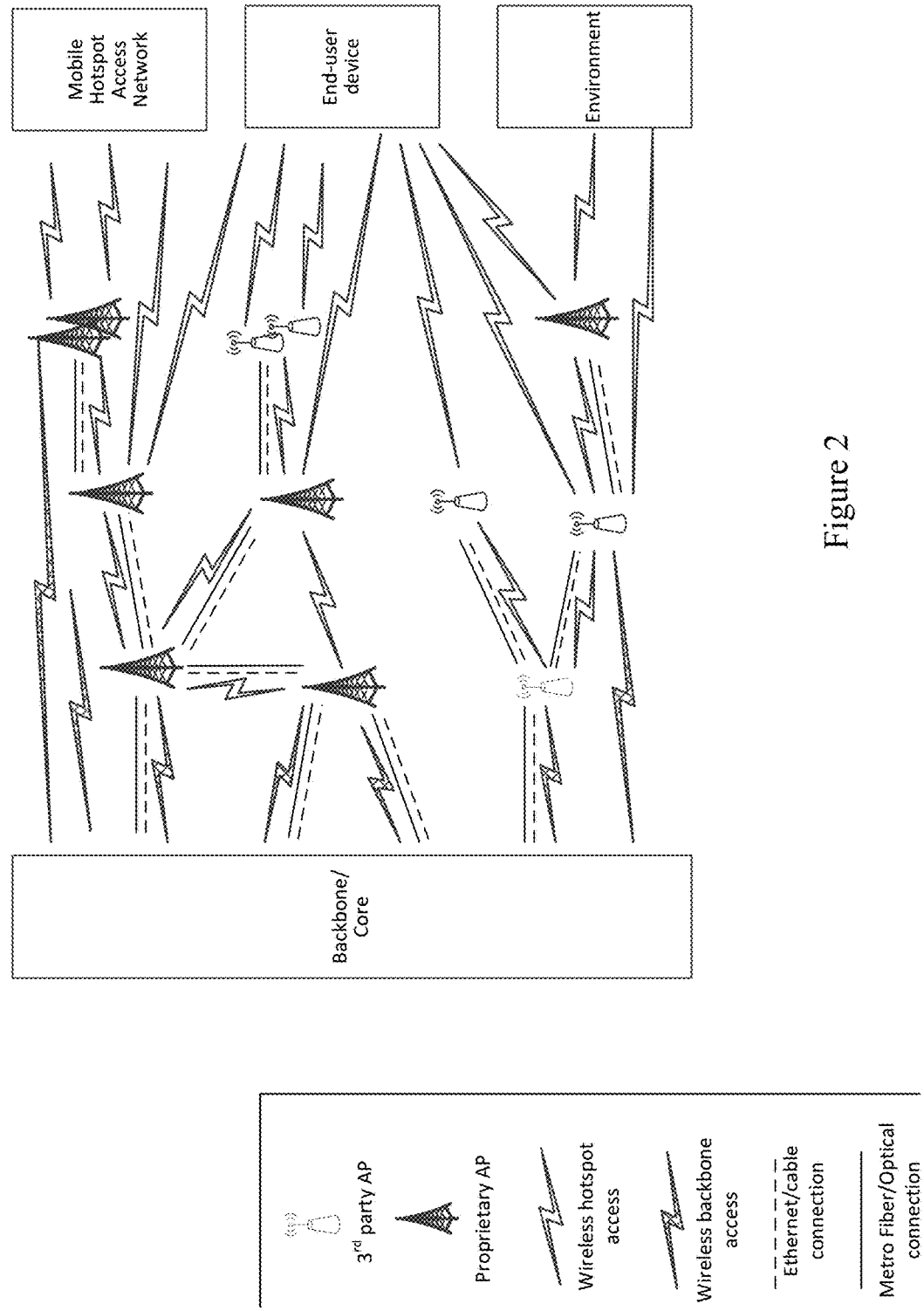
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein n.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
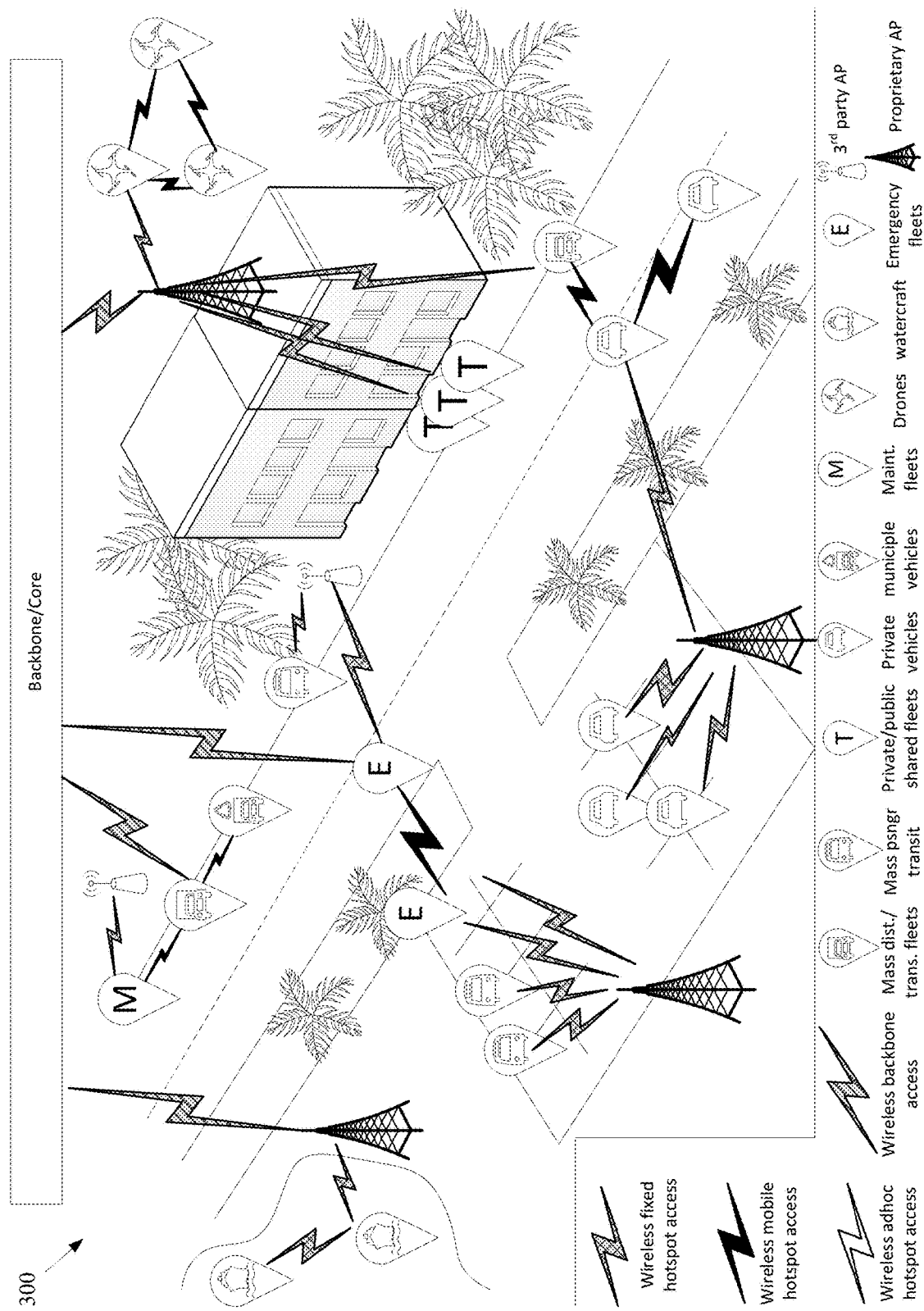
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
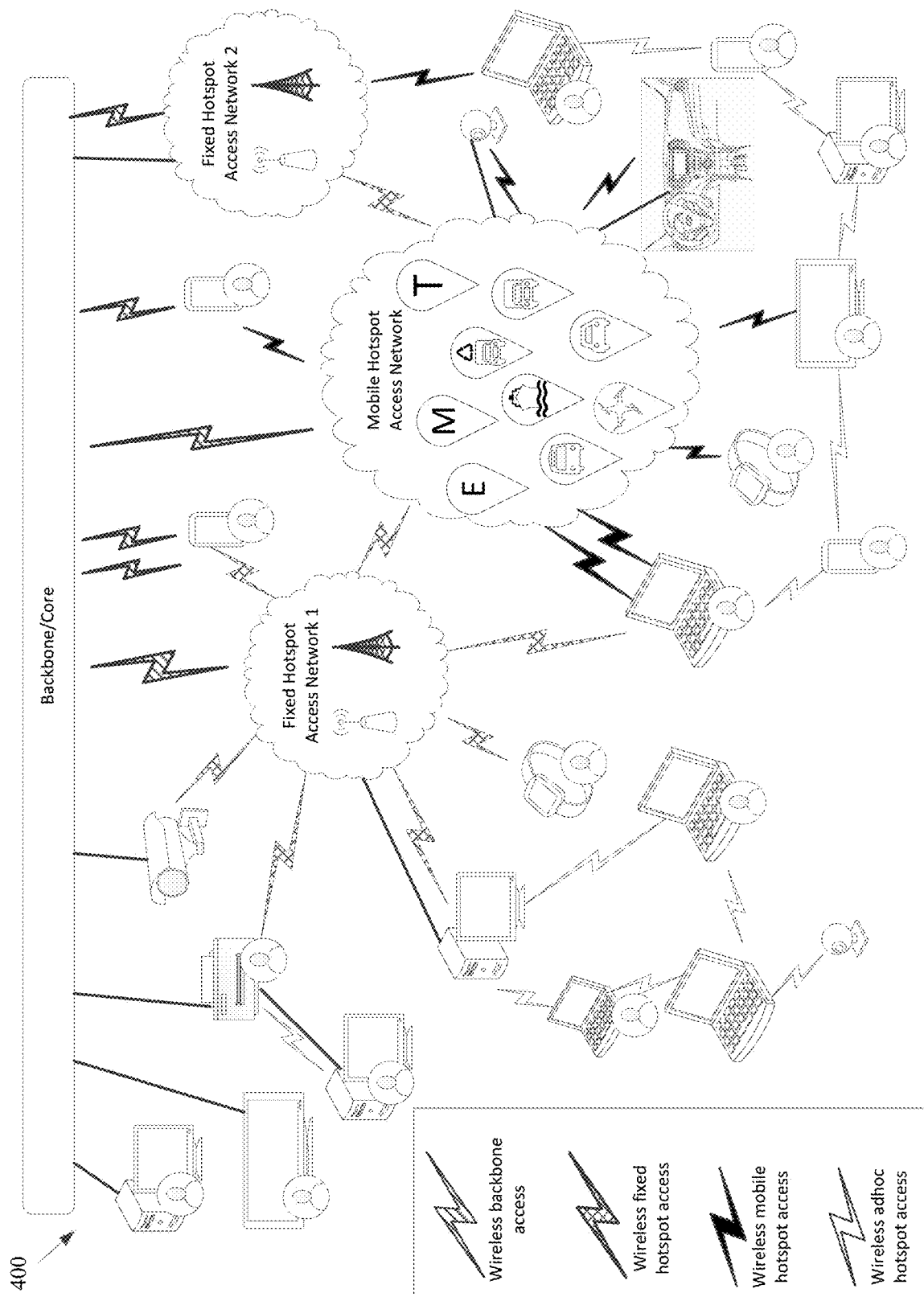
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
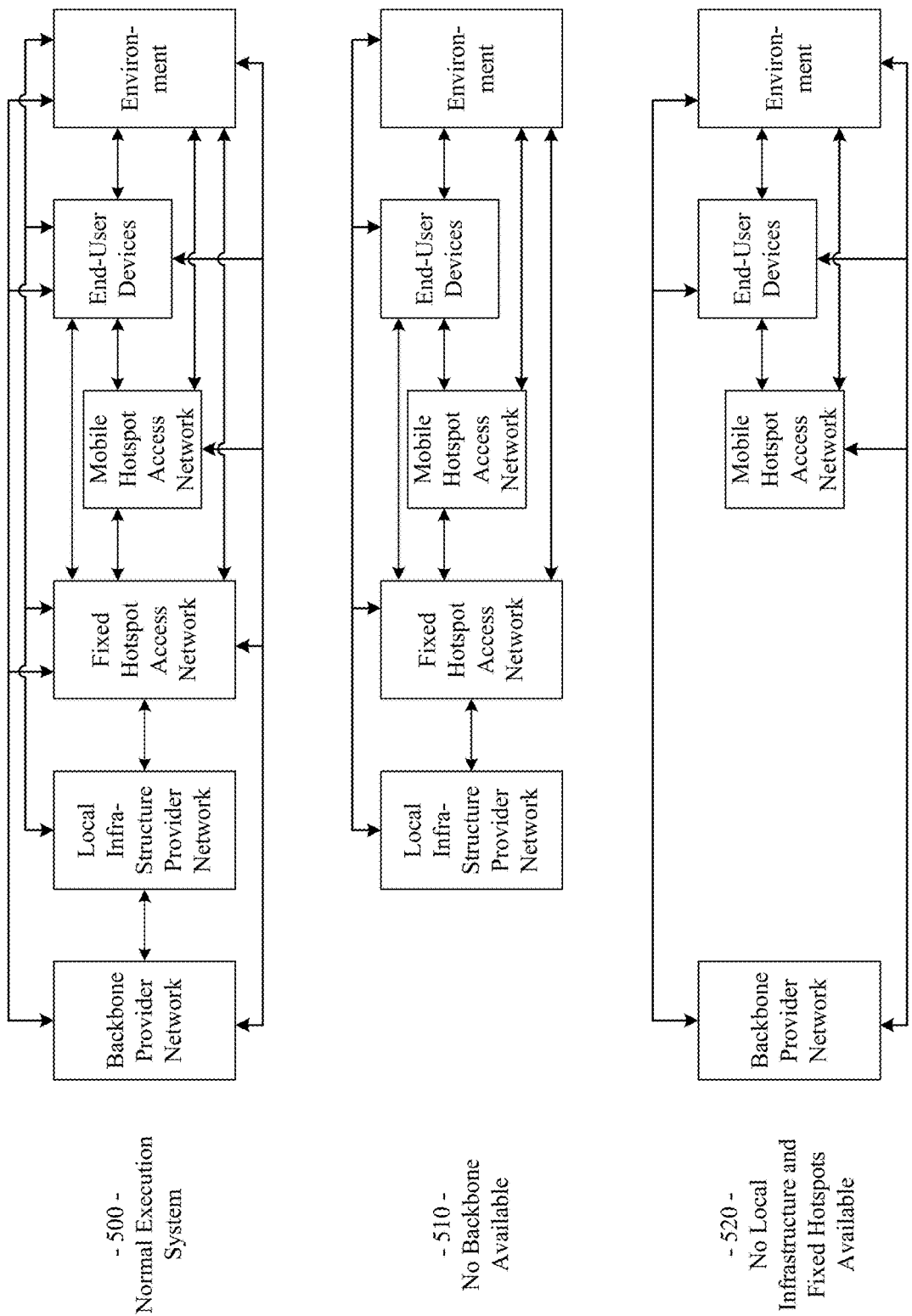
FIGS. 5A-5C show a plurality of network configurations illustrating the flexibility and/or and resiliency of a communication network, in accordance with various aspects of this disclosure.
Figure 5B:
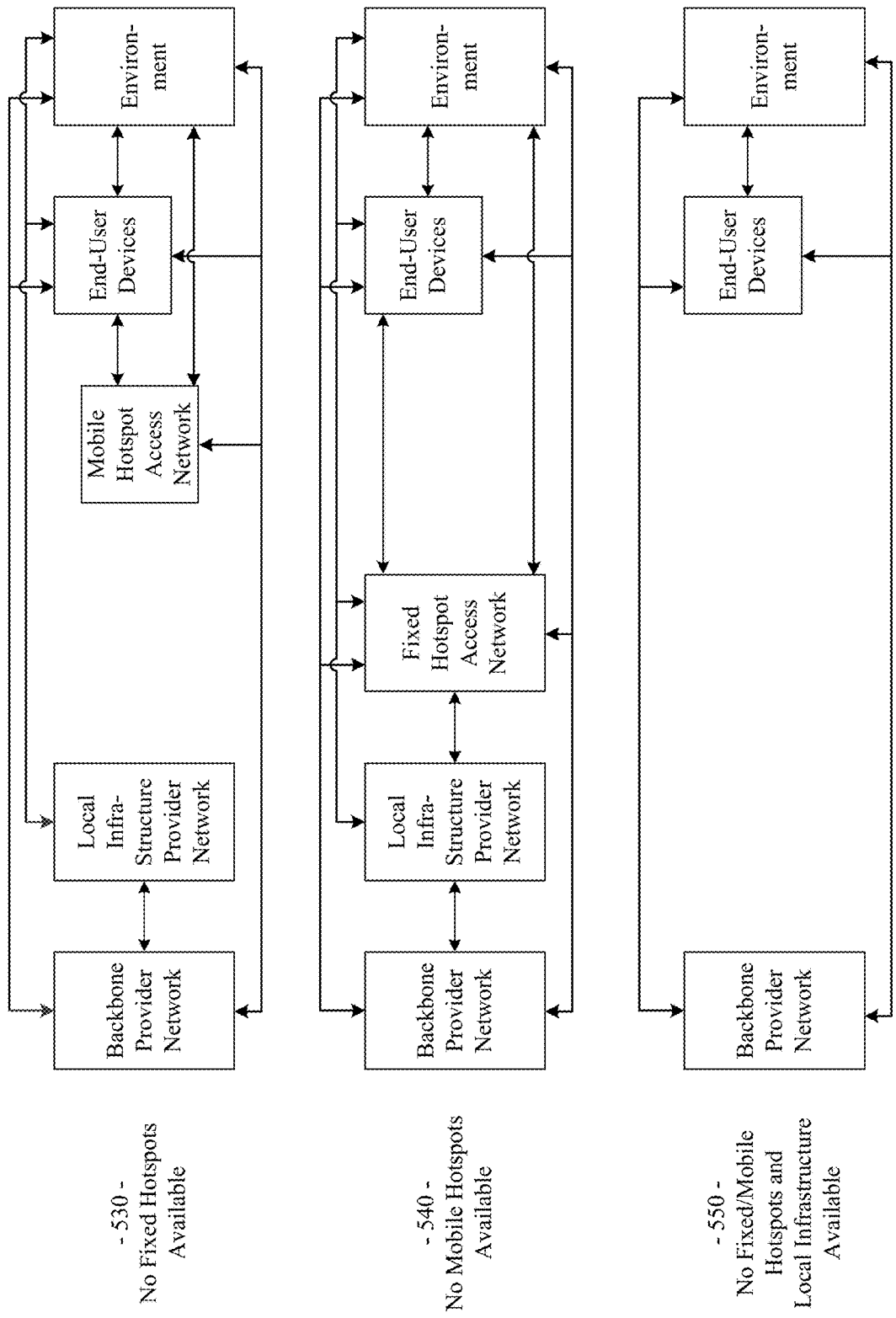
Figure 5C:
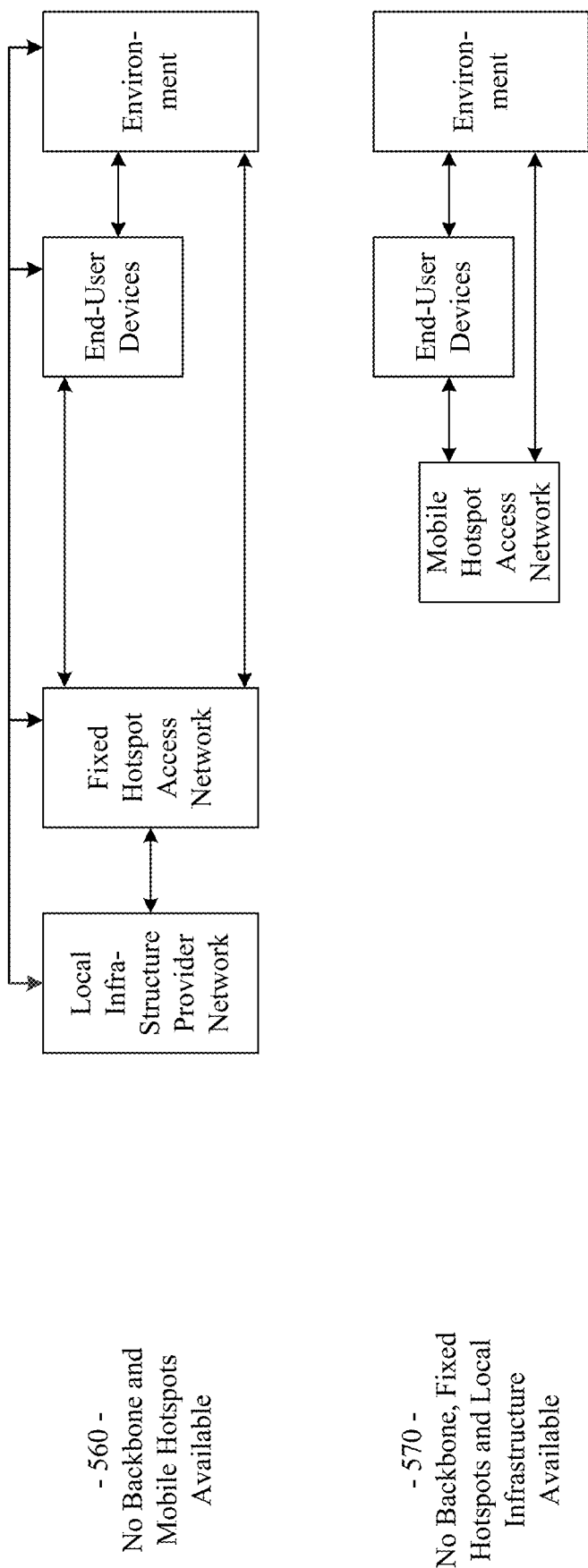

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
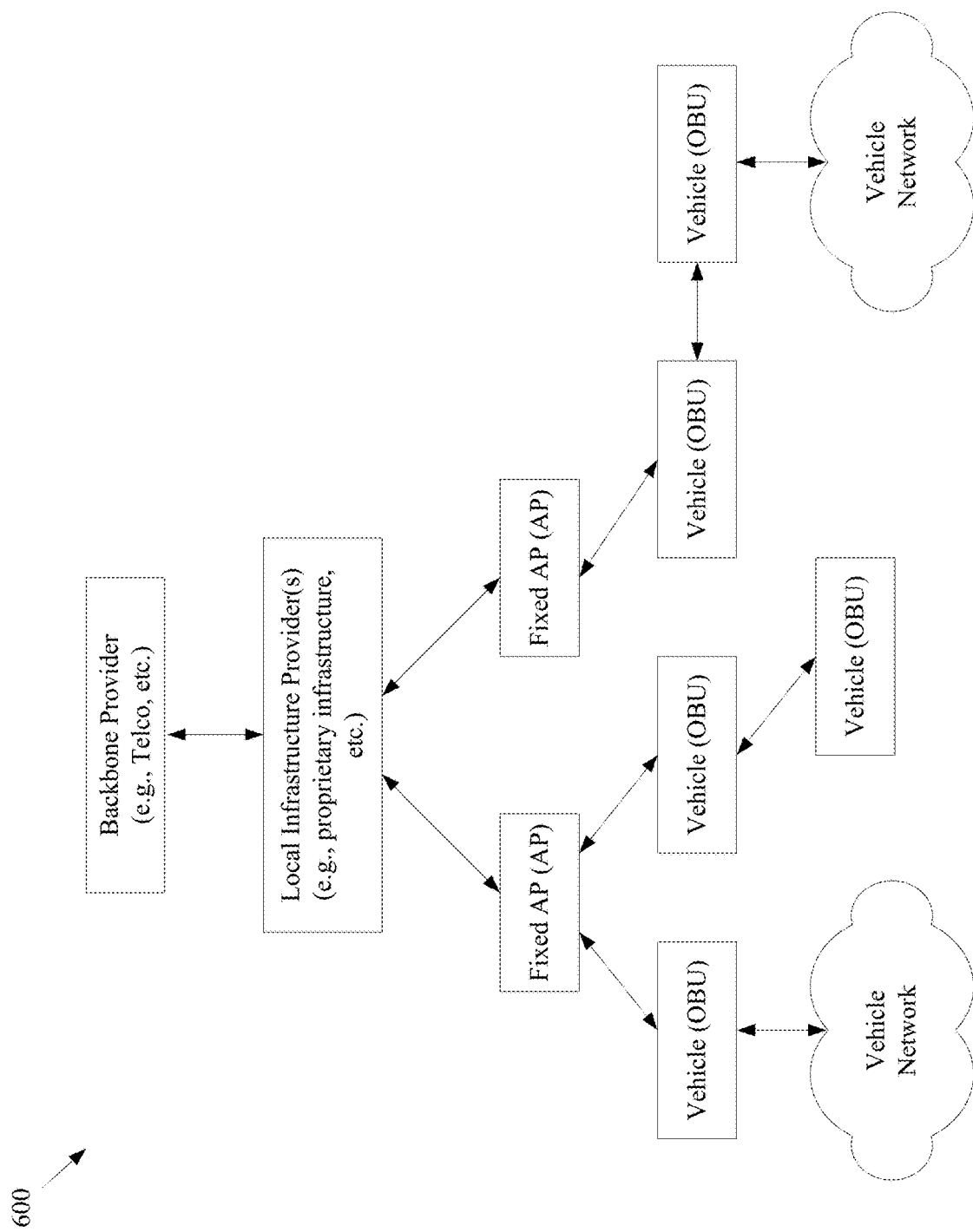
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., IEEE 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an Local Mobility Anchor (LMA) or Network Controller (NC), may monitor the location (e.g., network location, etc.) of various nodes (e.g., Mobile APs, etc.) and/or the location of end users connected through them. The mobility controller/network controller (MC/NC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

As discussed above, a network of moving things in accordance with various aspects of the present disclosure (e.g., an Internet of Moving Things) may be expected to include a vehicular network with mobile access points (MAPs) and fixed access points (FAPs) sharing multiple communication connections using the same or different communication technologies in a very heterogeneous environment. Expectations are that there will also be various devices that will connect to the vehicular network, and that application developers and the end-users of such devices will want to exploit the many communication paths (e.g., "multi-paths") formed by the elements of the Internet of Moving Things, to transport data among various devices. The present disclosure describes and defines example strategies that may be used to aggregate/split traffic from/to the heterogeneous communication paths that will be available in a network of moving things as described herein.

The elements of a network of moving things in accordance with the present disclosure strives to take into account all of the context information of the data traffic, the network devices, and the communication links, in order to find a best fit between the data traffic requirements/characteristics and the communication paths available (e.g., communication links and network devices). For example, data traffic that is quite sensitive to packet loss may be routed through a communication path that ensures 100% probability of delivery, while data traffic that is quite urgent and has a small footprint (i.e., data traffic that needs just a small amount of resources in terms of bandwidth/throughput, because the data traffic only involves the transfer of a small number of packets/bytes to the destination) may be routed through a communication path having low bandwidth but extremely low delay and jitter. Moreover, data traffic that is "delay tolerant" or "session disruption tolerant" may use a less reliable communication path that does not have mobility support. A network in accordance with aspects of the present disclosure determines the current communication path that best fits each flow of data, in order to map the data traffic requirements to the communication links, the network device characteristics, and current network conditions.

A network of moving things according to various aspects of the present disclosure exploits a "multi-homing environment" created in such a network (e.g., an Internet of Moving Things), which employs multiple communication networks and communication paths using the same or different communication technologies. A network as described herein provides "multipath" in heterogeneous environments (e.g., for each IP address, each data flow, and/or each packet). Such a network may customize (e.g., personalize) multipath selection to fit traffic requirements into characteristics and conditions of the links and nodes/devices of the network, which allows the network to increase the overall quality of experience (QoE) for all traffic flows since they will be treated according to their needs. A network of moving things in accordance with aspects of the present disclosure may aggregate and split flows in order to increase overall bandwidth, reduce cost, provide fallback and/or fault tolerance, increase redundancy, and optimize the network resources that are available, for example. Such a network may reduce/remove network bottlenecks using, for example, aggregation of links to overcome low bandwidth, or splitting of traffic flow to reduce delay and jitter. When a node of such a network is receiving the same traffic flow over multiple paths, the node is able to decide what to do with each packet, and may choose to discard/drop the packet because multiple copies have been received using other paths, to buffer that packet to be re-transmitted again over another path, or to order that packet with the ones received through other paths. A network in accordance with aspects of the present disclosure allows the operator(s) to define rules/policies/metrics that permit each node to decide when to aggregate (or not to aggregate) into one traffic flow over one path, multiple traffic flows transported over different paths, or to split a traffic flow among multiple paths, permitting such a network to provide coverage for the use-cases discussed below.

Figure 7A:
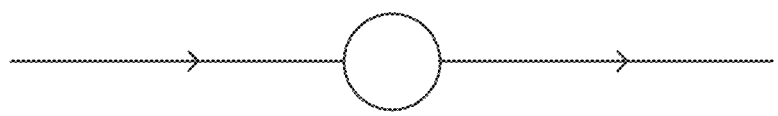
FIGS. 7A to 7D illustrate a number of example information flow scenarios, in accordance with various aspects of the present disclosure.
Figure 7B:
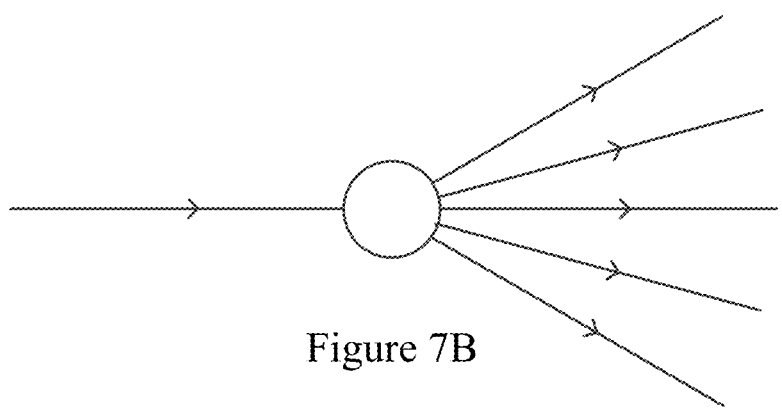
Figure 7C:
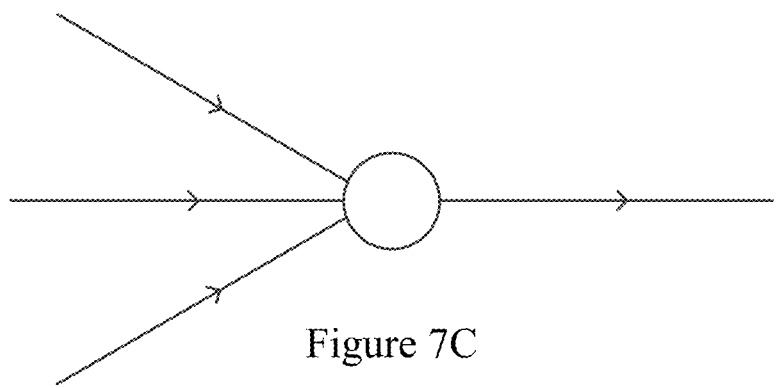
Figure 7D:
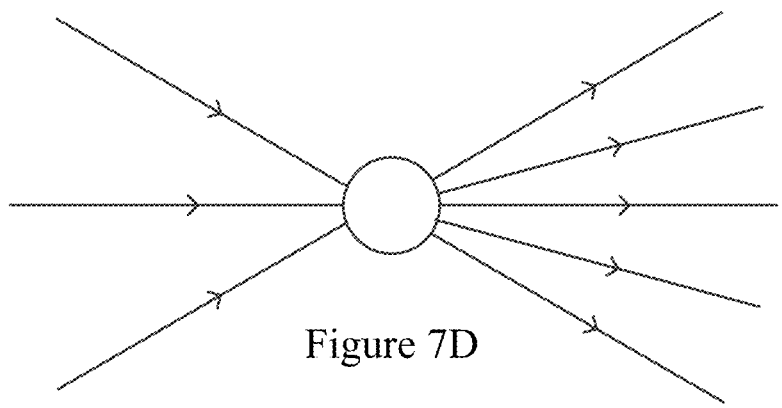

FIGS. 7A to 7D illustrate a number of example information flow scenarios, in accordance with various aspects of the present disclosure. For example, FIG. 7A shows a network node in which a single traffic flow enters the node, and a single traffic flow leaves the node. In this scenario, no aggregation and no splitting takes place. However, the example of FIG. 7B illustrates a situation in which a network node receives a single traffic flow, and splits the received traffic flow into a number of flows each comprising a portion of the received flow of traffic. Depending on the nature of the multiple communication paths that are available, and the traffic of the network as a whole, the network node of FIG. 7B may choose to send various portions (e.g., one or more packets) of the received traffic flow redundantly or uniquely over the various communication paths that are available to the network node. FIG. 7C shows an example situation in which a network node receives multiple traffic flows and chooses to aggregate the received flows for transmission over a single egress communication path. This may, for example, occur when the network node is receiving a number of streams of traffic from unreliable communication paths that may carry redundant portions of a traffic flow, and the node aggregates the incoming flows into a single flow of traffic communicated over a reliable and possible higher speed egress path. FIG. 7D illustrates an example information traffic flow scenario which may be viewed as a combination of FIG. 7B and FIG. 7C, in which multiple flows of information traffic are received by a network node, which splits and/or aggregates the information from the received flows to form multiple outgoing information flows over respective communication links. As mentioned above, the actions of the network nodes illustrated in FIGS. 7A-7D may be controlled according to algorithms and rules dynamically chosen by the operator of a network of moving things in accordance with the present disclosure.

The system and mechanisms presented in this document are intended to exploit the scenarios involving network elements of an Internet of moving things as described herein, in which network devices (e.g., mobile APs, fixed APs, network controllers, etc.) are able to form multiple communications connections using one or more networks and different communication technologies (e.g., Wi-Fi (for example, IEEE 802.11a/b/g/n/ac/af), dedicated short range communication (DSRC)(e.g., IEEE 802.11p), and/or cellular (e.g., frequency/time/code/space division multiple access public networks referred to as "2.5G", "3G", "4G", "LTE", UMTS, GSM, CDMA, etc.). In such a network, path selection may, for example, be based on Internet protocol (IP) source/destination addresses, a flow identifier (ID), or a packet ID, and a set of mechanisms to support such selection in heterogeneous scenarios is provided. In accordance with various aspects of the present disclosure, the traffic flow requirements of the end-users may be mapped into the characteristics and capabilities of the various network communication links and devices. A network in accordance with aspects of the present disclosure capitalizes on many advantages of wisely using the multiple connections available in such a network, to provide increased resource optimization (e.g., an increase in total network bandwidth), to provide fallback mechanisms, and to increase QoE of the end-user/device.

The splitting of a flow of information through different paths of a network presents challenges, which may depend on the type of traffic of the flow. For example, differences in the characteristics (e.g., latency/delay, bit/packet error rate, jitter, capacity) of different paths through a network may mislead the functionality of communication protocols (e.g., the TCP transport layer) into determining that a communication session is unstable and may lead such protocol mechanisms to unnecessarily retransmit packets, reducing the transmission throughput/data rate, or in some scenarios, even close a communication session. In accordance with various aspects of the present disclosure, a split of a flow of traffic across paths may be done according to the type of traffic, and such a split increases the throughput of the network, improving the quality of service (QoS)/quality of experience (QoE) for the end-user including, for example, the time involved in getting the desired data to the end-user consumer of the flow of information.

The splitting of a flow of information through different paths of a network may, for example, also depend on the delay/jitter incurred by packets using different communication paths through the network. For example, for traffic flows of real-time information (e.g., data communication for a Skype™ call or for real-time video), QoS and QoE may suffer when packets arrive out of order, which may have a direct impact on the quality of the sound and/or image/video presented to the receiving party. A network of moving things in accordance with various aspects of the present disclosure may dynamically adjust for such requirements of the service being supported. For example, each network node may dynamically measure parameters such as, e.g., packet delay/jitter and the occurrence of packets being received out of order for each of the communication links currently in use by the node. Such context information may be shared by each node with neighboring nodes (e.g., those within wireless communication range), and may be used by the nodes that receive it, along with their own measured parameters, to adjust the path(s) to be used for communication of the future packets based on the history of parameters measured for previous packets and communication links. For example, packets for services that are able to tolerate packets received out of order, packets that are delayed more than a certain amount, or packets that have more than a certain amount of jitter may be communicated using communication paths that have been selected according to measured values for each of such relevant path characteristics.

In addition, the splitting of a flow of information through different paths of a network may, for example, depend on whether one or more of the paths being used to communicate packets incurs a relatively high or higher than acceptable packet loss (i.e., for the service for which the packets are being communicated), which may cause one or more retransmissions and a resultant lower network throughput that impacts the final perception of the flow of traffic through the network. A network of moving things in accordance with various aspects of the present disclosure may monitor and adjust portions of the communication path when such impairments are detected. The decision by a network node to split or not to split a packet flow may take into account various requirements of the flow/service, current network and/or node context information, and the currently measured characteristics of and resources provided by different communication paths. For example, a flow of information (e.g., a flow of packets) that is marked as "urgent" or "premium service" and is to be transferred as quickly as possible may be communicated from one node to another using multiple communication paths, where measurements for each communication path indicate a good/acceptable path throughput, while other information flows such as, for example, routine email communication, may be communicated via a single communication path using less network resources. In another situation, a client/end-user may desire to engage in a video call, and the serving node may currently have just one communication path available that provides adequate throughout and has an acceptable amount of packet loss. In such a situation, the node serving the client/end-user may decide to use a single communication path because using additional communication paths may result in negative impact on the communication service(s) provided to other clients/end-users.

A network in accordance with various aspects of the present disclosure realizes a number of advantages of splitting and/or aggregating traffic flows. For example, a network according to aspects of the present disclosure may be configured to reduce communication cost by using the lowest cost connection(s) between the network elements used to transport the flow of information. In addition, a network as disclosed herein can provide greater bandwidth from the aggregation of all available connections between network elements. Further, the elements (e.g., nodes such as mobile APs, fixed APs, network controllers, etc.) of a network according to the present disclosure may be automatically and dynamically configured to provide customized (e.g., personalized) treatment to each traffic flow based on individual requirements, and in doing so provide overall improvement of the QoE for each flow. A network in accordance with various aspects of the present disclosure is also able to provide on-demand fallback configurations through active adjustment of the multiple connections that may be used to link the various elements of the network. Nodes of a network in accordance with the present disclosure work to find a best fit between the needs of the services/traffic to be supported by the node, and the available resources of the node. The available resources and characteristics of the communication paths/links are continually measured by node software, so that the node(s) of the network are able to reach decision based on trustable assumptions. An on-demand fallback configuration in accordance with aspects of the present disclosure may be provided to support node services/traffic when a failure in a current communication path occurs, or when the node moves to another geographic location within the area served by the network. The nodes of a network of moving things in accordance with aspects of the present disclosure are always evaluating network node failures/impairments and communication path failures/impairments, and can easily react to any such failures/impairments.

Figure 8:
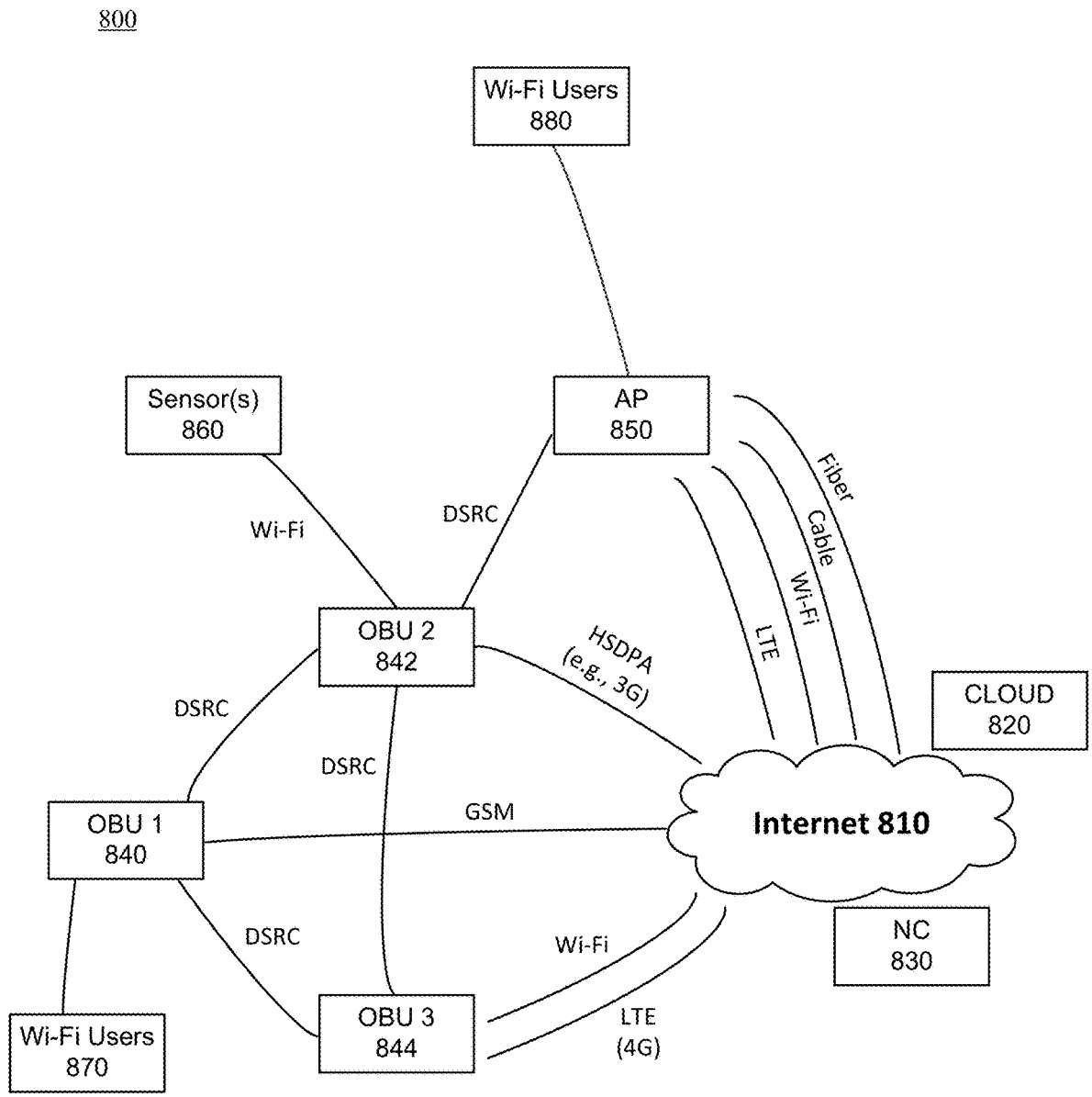
FIG. 8 is a block diagram illustrating the elements of an example network of moving things and the links and communication technologies that interconnect them, in accordance with various aspects of the present disclosure.

FIG. 8 is a block diagram illustrating the elements of an example network of moving things and the links and communication technologies that interconnect them, in accordance with various aspects of the present disclosure. The example of FIG. 8 shows a number of on-board units (OBUs) OBU 1 840, OBU 2 842, OBU 3 844 that are interconnected with one another by DSRC communication links. As noted above, the reference to an OBU may also represent a reference to a mobile access point (MAP) that may be located in, for example, any of a number of different types of vehicles including, for example, an automobile, taxi, van, truck, bus, train, and/or an autonomous vehicle (AV), to name just a few examples. The OBU 1 840 is shown in the example of FIG. 8 as being linked via Wi-Fi to devices of end-users 870, and the OBU 2 842 is illustrated as being linked via Wi-Fi to one or more sensors 860. The OBU 1 840 of FIG. 8 is also configured to communicate with an Internet 810 using a cellular (e.g., GSM) network, and the OBU 3 844 is configured to communicate with the Internet 810 using Wi-Fi and/or a cellular interface (e.g., LTE (4G)). FIG. 8 also includes an access point 850 (e.g., a fixed AP) that serves devices of end-users 880 via Wi-Fi, and that is configured for communication with OBU 2 842 via DSRC and with the Internet 810 using one or more of an optical fiber infrastructure, a cable network infrastructure, a wireless cellular network (e.g., LTE), and/or a Wi-Fi communication link. The Internet 810 is also illustrated as interconnected with a network controller (NC) 830 and a Cloud 820. The following discussion makes reference to the elements of FIG. 8.

The term "multi-homing" may be used in this disclosure to refer to the use of multiple communication paths employing a single, or two or more different communication technologies to split/aggregate traffic flows. As can be seen in the example of FIG. 8, network elements (e.g., network nodes/devices such as fixed APs, mobile APs, NCs, sensors, etc.) that are configured for communication using multiple communication technologies are able to send their information traffic flows to, for example, the NC 830 or the Cloud 820, by exploiting the numerous paths that are available to interconnect the various network nodes/elements. The following discussion provides a number of examples of the selection of communication paths that take into consideration the type of information traffic being communicated and the source node.

In a network in accordance with various aspects of the present disclosure, temperature measurements from a sensor such as, for example, one of the sensors 860 that is communicatively coupled to the OBU 2 842, to a network element such as, for example, the NC 830 or functionality of the Cloud 820, may not need to be uploaded to the NC 830/Cloud 830 in real-time to meet the goals/requirements of the end-user/client for such information. Therefore, a delay tolerant approach may be used to communicate the temperature measurement information from the information source to the destination. In such a situation, the measurements from the temperature sensor (e.g., one or more of sensor(s) 860) may be communicated through, for example, the AP 850 using DSRC, which may be much less expensive than other choices, and may have adequate bandwidth available. If an AP (e.g., AP 850) is not within range of the OBU 2 842 at the time the temperature sensor data become available, the OBU 2 842 may choose to store the temperature measurement information from the temperature sensor 860 (e.g., in packets or another data structure in memory) for a period of time, and may later send the stored temperature measurement information to another network element (e.g., a fixed AP or another OBU), depending on the storage capacity of the OBU 2 842. In another implementation according to the present disclosure, some of the delay tolerant information flow (e.g., temperature values of sensors such as sensors 860) may be offloaded (e.g., as packets) from a node that received such data (e.g., OBU 842), through a communication link to a neighbor OBU that has a data communication path to the Internet such as, for example, through the DSRC communication link to the OBU 3 844 with Wi-Fi connectivity to the Internet 810.

In a network in accordance with various aspects of the present disclosure, data traffic for end-user devices may, for example, be served using Wi-Fi via an access point (e.g., a fixed AP) along a street, such as the AP 850 serving the Wi-Fi end-user 880 of FIG. 8. In such a scenario, the serving AP may transfer such end-user Wi-Fi traffic to/from the Internet through a node of the network (e.g., the NC 830), and may have a number of different communication technologies available. For example, in the illustrated example of FIG. 8, the AP 850 serving the Wi-Fi end-user 880 has four different communication technologies (i.e., fiber, cable, Wi-Fi, and cellular (4G (LTE))) available with which to communicate with the Internet 810. For Wi-Fi end-users engaged in a real-time or other application for which the QoE is related to end-to-end delay and available bandwidth (e.g., such as a video calls session via Skype™), a relatively higher bandwidth and relatively lower end-to-end latency/delay, as compared to other available options (e.g., in FIG. 8, cable, Wi-Fi, and LTE (4G)) may be chosen by any given network node (e.g., AP, NC, etc.). However, for a Wi-Fi end-user 880 engaged in browsing the Internet, the AP (e.g., AP 850) may choose to use a Wi-Fi connection or a cable connection to the Internet 810, depending on the characteristics of those communication technology options, based on a set of rules provided to the AP 850 and/or link characteristics determined by the AP 850 using monitoring of communication via the communication technology options available to the AP 850. It should be noted, however, that in the case of a failure of, or a traffic overload on one or more of the other communication technologies options available to an AP, the AP (e.g., the AP 850) may choose to use a less desirable alternative communication technology option. For instance, in the current example, a communication technology having a greater latency or lower bandwidth/capacity than the preferred or best communication technology option according to any rules or algorithms for selecting the best option according to end-user activity (e.g., LTE (4G)) may be chosen, to ensure that Wi-Fi service to the end-user does not experience service disruptions. This approach may come into use when, for example, a network operator is expecting to do maintenance upon a cable and/or a fiber connection to the AP, and wants user traffic to be temporarily moved to a satisfactory, but possibly less desirable alternative communication technology.

In a network in accordance with various aspects of the present disclosure, end-user Wi-Fi Internet traffic from a mobile AP (e.g., OBU 3 844) may, for example, be split into portions communicated to the Internet (e.g., Internet 810)

via multiple communication technologies such as Wi-Fi and LTE (4G). Such node behavior may, for example, be guided by rules configured to use Wi-Fi, at relatively low or no cost, for traffic flows that are disruption tolerant, and to use LTE (4G), at a relatively higher cost, for other network traffic that may not be tolerant of network disruptions. While traffic flows supporting disruption-intolerant end-user applications may be selected by an OBU (e.g., OBU 3 844) for communication using a first (e.g., cellular) communication technology option, and the OBU may select a second (e.g., Wi-Fi) communication technology for disruption-tolerant end-user traffic, such an OBU may, upon moving out of range of the second (e.g., Wi-Fi) connection, reestablish any disruption-tolerant communication sessions/flows sharing the capacity of the first (e.g., cellular) connection with the established traffic flows supporting the disruption-intolerant end-user applications. In accordance with some aspects of the present disclosure, communication sessions that don't really need IP mobility support may, for example, be routed by an OBU (e.g., OBU 3 844) to the destination using a suitable wireless (e.g., Wi-Fi, cellular (e.g., GSM, LTE, etc.)) communication technology, without routing traffic for that communication session through an NC (e.g., NC 830). For example, some information sources/services on the Internet (e.g., YouTube™) are engineered to be tolerant of disruptions of the communication path to the end-user and self-manage such disruptions. Communication sessions for such information sources/services may be reestablished through the OBU via any suitable and available wireless communication technology (e.g., via any of one or more Wi-Fi, LTE, GSM, etc. communication technologies or wireless interfaces) directly to the destination, without involving an NC. A network node (e.g., OBU 3 844) may also use a multi-hop communication path through, for example, another network node (e.g., OBU 2 842) that has a connection via DSRC to an AP (e.g., AP 850), for short duration flows that require a low latency/delay connection with low cost.

In a network in accordance with various aspects of the present disclosure, a network node such as, for example, an OBU (e.g., OBU 1 840) may generate a flow of data such as real-time location data (e.g., geographic coordinate data (e.g., latitude/longitude values)). The OBU 1 840 may choose to use any or all of the communication technologies of the OBU 1 840 to communicate such location data including, for example, the functionality supporting the two DSRC links connecting the OBU 1 840 with the OBU 2 842 and the OBU 3 844, and the cellular (e.g., GSM) communication functionality enabling communication of the OBU 1 840 to a destination accessible via the Internet 810. The OBU 1 840 may, for example, send a location data sample using a first communication technology, such as the GSM communication functionality of the OBU 1 840, at a first regular time interval (e.g., every 10 seconds), to ensure that at least one location sample is always received at the first regular time interval, and the OBU 1 840 may, for example, increase the granularity of the location data samples by transmitting an additional one location data sample at each occurrence of a second regular time interval (e.g., one location data sample every second) using a second communication technology such as the DSRC connections of OBU 1 840, during the first regular time interval between the sending of location data samples using the cellular (e.g., GSM) communication capabilities of OBU 1 840. In accordance with various aspects of the present disclosure, a first network node such as, for example, the OBU 1 840 may choose one among multiple communication (e.g., DSRC) connections of the first node (e.g., OBU 1 840) to send the data of a traffic flow (e.g., location data samples) through a certain second network node (e.g., OBU 2 842) towards the destination of the traffic flow. In the example of FIG. 8, this may be because the second network node (e.g., OBU 2 842) has certain communication technologies and/or interconnections available (e.g., a low cost DSRC communication link with the AP 850 that is more reliable than the Wi-Fi communication capabilities of the OBU 3 844 to the Internet) that enable the network according to the present disclosure to provide a desired end-to-end QoS and/or QoE. In accordance with aspects of the present disclosure, each of the various nodes of a network (e.g., OBU 1 840, OBU 2 842, etc.) may share information about their various communication path characteristics and node resources with neighbor nodes (e.g., nodes within wireless communication range). In this way, each network node may have updated information used to arrive at a good decision about use of communication paths and node resources. To accomplish this, each network node may continually measure the performance of each of the different communication paths/links, resources in use, etc., and may propagate that performance and resource information to neighbor nodes. Each network node with which such information is shared may then use a collection of all such information received from the neighbors, to reach a best decision on, for example, selection of communication paths, splitting/aggregation of flows of traffic, use of node storage, etc. In accordance with some aspects of the present disclosure, each network node may reach a decision based on its own current context information. In accordance with aspects of the present disclosure, all communication paths/connections of a neighbor node may be viewed as a single neighbor connection. In such an approach, if a first node chooses to use a particular communication path of a second node to send data traffic for a service, and finds that the use of that particular communication path results in a negative impact on the first node, then the first node may choose not to use the second node at all for that service/flow of traffic.

Figure 9:
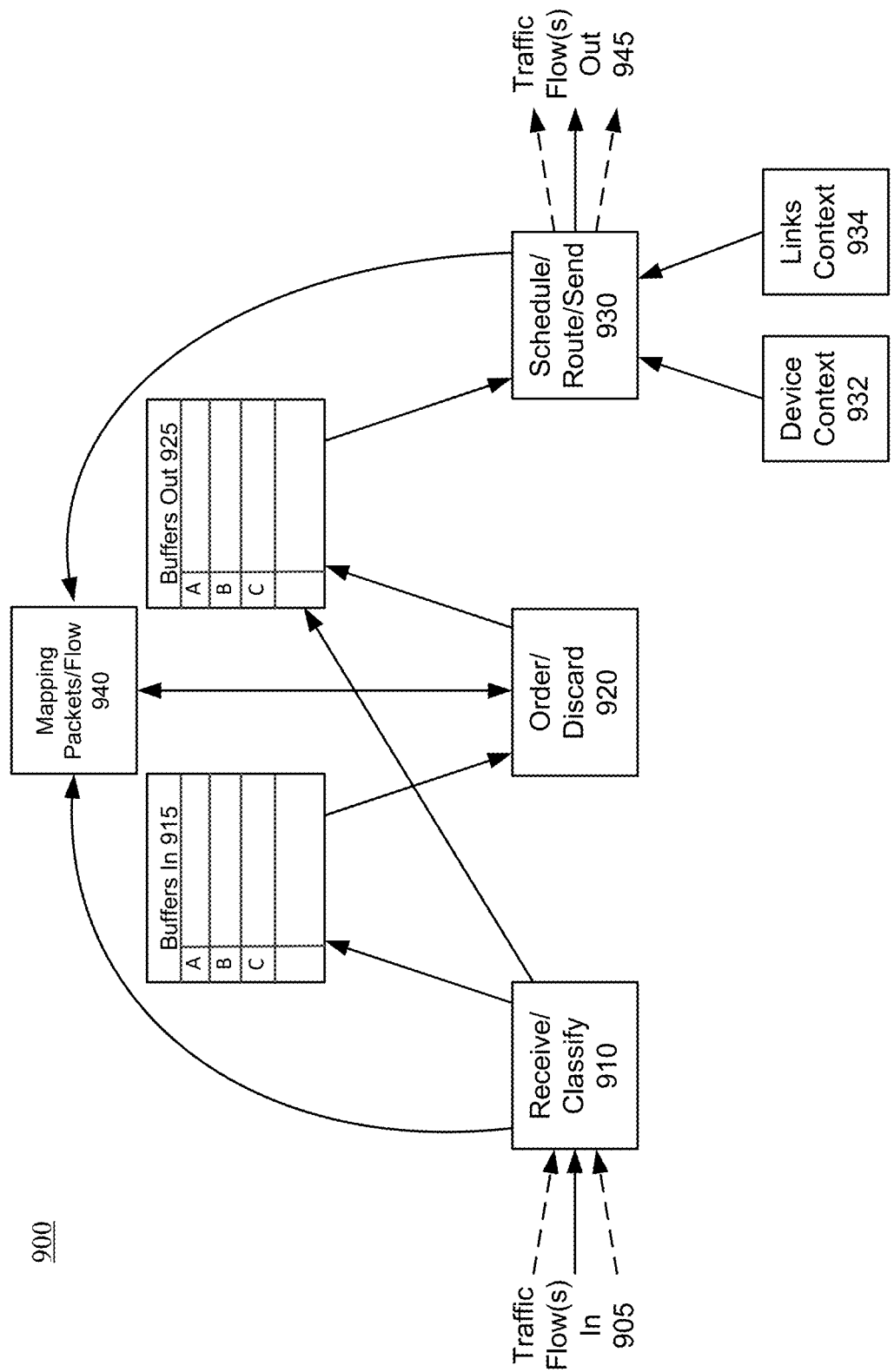
FIG. 9 is a block diagram illustrating an example system architecture of a network node, in accordance with various aspects of the present disclosure.

FIG. 9 is a block diagram illustrating an example system architecture of a network node, in accordance with various aspects of the present disclosure. The example architecture shown in FIG. 9 includes a receive/classify functional block 910, an order/discard functional block 920, a schedule/route/send functional block 930, and a mapping packets/flow functional block 940, which are described below. The architecture of FIG. 9 also includes a buffers-in storage 915, a buffers-out storage 925, device context information 932, and links context information 934.

The buffers-in storage 915 and buffers-out storage 925 each represent a set of queues for the storage of different classes of data traffic according to information items and/or parameters that are defined below. Functional blocks of FIG. 9 such as, for example, the receive/classify functional block 910, order/discard functional block 920, and schedule/route/send functional block 930 may use scheduling mechanisms to select packets of traffic flows from the queues of the buffers-in storage 915 and the buffers-out storage 925, and to send/order/discard the selected packets.

The receive/classify functional block 910 of FIG. 9 receives packets of traffic flows 905 from one or more communication interfaces of a network node (e.g., a DSRC, Wi-Fi, cellular, fiber, cable, etc. interface of a mobile AP, a fixed AP, an NC, etc.) and performs analysis of the received packets/traffic flows 905, to provide traffic classifications based on the information contained within the received packets, or based on a set of defined rules based on, for example, flow identifiers, IP source/destination addresses, User Datagram Protocol (UDP) ports, and/or Transmission Control Protocol (TCP) ports. In accordance with various aspects of the present disclosure, traffic classification may be done in a number of ways. For example, traffic classification may use a "flow ID" in an IPv6 header, an IP source address and/or destination address, and/or a UDP/TCP source and/or destination port. The traffic may, for example, be classified according to various metrics such as, by way of illustration and not limitation, those regarding urgency and tolerance/impact/requirements regarding delay, jitter, loss, bandwidth, mobility, session disruption, privacy, and/or security. The classification may be done in the OBU, which may mark each packet/flow/session with a respective Class-of-Service (CoS), so that the OBU may then apply a routing strategy based on a set of well-defined CoS and not an individual packet assessment. The traffic classification approach used may employ one or more field(s) in packet headers into which the CoS for each packet may be placed. In instances in which the classification is at a higher degree of granularity, the OBU may directly route the packets from a specific subset/classification through a preferred path for that subset/classification. Further details of the context information used to classify packets/traffic flows are described below.

If the analysis of the received packets indicates a need for treatment regarding reordering of received packets, the received packets may be stored in one of the queues of the buffer-in storage 915. The need for correct packet order, and therefore for packet reordering by a node when errors in packet order are detected, may be indicated by specifying the service needs for each flow of data through the node, so that a packet that belongs to a service that requires correct packet order may have re-ordering applied when needed. Certain types of services (e.g., on-demand video streaming) that may be transported by a network as described herein may be quite sensitive to packet ordering. If no need for packet reordering is indicated, the received packets may be moved directly to a queue in the buffer-out storage 925. In both cases, the receive/classify functional block 910 communicates with the mapping packets/flow functional block 940, to determine whether the received packet was recently received for the first time or is a duplicate of a packet previously received, before the received packet is placed in the buffer-in storage 915 or the buffer-out storage 925. To support this, a node in accordance with the present disclosure may maintain a list of packets received during a recent period of time (e.g., last second, last 5 seconds, last 15 seconds, etc.) and may check such a list to determine whether the received packet is present, or the node may check buffers containing recently received packets or packet headers (e.g., received in the last second, last 5 seconds, last 15 seconds, etc.), to determine whether the received packet is represented. Such checks/determinations may occur at each node of the network. If the current received packet is a duplicate of a packet that was previously received, the current received packet may be dropped, otherwise the current received packet may be marked by the mapping packets/flow functional block 940 with status "received" and all of the parameters from the packet classification process (e.g., delay, mobility, and security/privacy) for the received packet may be stored. The receive/classify functional block 910 is responsible for updating the status of the received packet in the mapping packets/flow functional block 940 to a status of "BufferIN" or "BufferOUT," depending on the buffer used for each packet/flow (i.e., buffer-in storage 915 or buffer-out storage 925, respectively). In this manner, all but one of a set of duplicate packets used for parallel transmission over two or more unreliable communication links between a first network node and a second network node may be immediately eliminated upon receipt at the second network node, and the remaining copies do not propagate further. The following discussion provides some example rules/policies for packet/traffic flow classification.

In accordance with aspects of the present disclosure, different flows of information/traffic may have different security/privacy requirements. For example, for some traffic flows/packets, the location where the information was collected may need to be hidden and kept private, or the information may need to be encrypted to hide the content of the messages/packets that are communicated.

Different traffic flows of information packets may need different amounts of network bandwidth for their intended purposes, also referred to herein as having different bandwidth consumption. A network of moving things in accordance with aspects of the present disclosure may support distinguishing traffic/packet flows by their throughput requirements and bandwidth consumption, so that traffic/packet flows may be communicated using the most suitable path through the network based on throughput requirements and/or bandwidth consumption.

The various information traffic/packet flows transported by a network as described herein may have different delivery priorities and urgency for the information to arrive at its destination. Therefore, a network according to aspects of the present disclosure supports designation of varying traffic urgency requirements and handling of information traffic/packets that require a path with relatively greater reliability and/or urgency than other traffic/packet flows, and lower delay/jitter, in some cases without consideration of the cost of transport, while other information traffic/packet flows may be communicated using other paths through the network. Such considerations or end-user requirements may be expressed, for example, as an indication that a flow of information traffic/packets are QoS and/or QoE sensitive, and such traffic/packet flows may have one or more designated target/required QoS and/or QoE values In accordance with aspects of the present disclosure, a network node may maintain a QoS value for each flow of traffic currently being handled by the node, and may compute QoS using various network context information items that influence/affect QoS including, by way of example and not limitation, communication link throughput, packet delay, packet jitter, bit error rate, packet error rate, number of occurrences of out-of-order packets per unit time, signal to noise ratio, received signal strength indication (RSSI), measures of fading and/r multipath, etc.). Because a QoE value is an indication of user experience, and may depend upon the service in use, QoE may be provided by testing or polling of end-users during sessions with various services supported by the network. In accordance with some aspects of the present disclosure, analysis of historical network performance information and corresponding user satisfaction information may be used to create a model, and the model may be used at any point in time to generate an estimated or predicted QoE value for a service/flow of traffic, based on the performance requirements of the service/flow of traffic, and current network/node performance measurements (e.g., network and/or node context information).

A network in accordance with the present disclosure supports the designation, transport, and treatment of information traffic/packets that have high tolerance to delay and/or high packet loss tolerance, and may communicate delay tolerant information traffic/packets using a delay-tolerant-network (DTN) approach, or use paths having extremely variable, unpredictable, or high delay paths, while traffic with high packet loss tolerance may be communicated using a communication path that may be formed using network nodes located in moving vehicles, resulting in network paths that are constantly being disrupted. In accordance with aspects of the present disclosure, a packet or a traffic flow may be classified according to delay tolerance and/or packet loss tolerance.

A network in accordance with aspects of the present disclosure may be configured to support the routing of information traffic/packets according to sensitivity of the user(s) of such information traffic/packets to the order of receipt of the information/packets by the recipient/end-user, and the tolerance of the recipient of such information traffic/packets to the receipt of packets out of order. Information traffic that is more sensitive to packet ordering may, for example, be communicated through paths with lower jitter and higher stability, and/or use network paths that include network devices that provide buffering and reordering functionalities.

A network in accordance with aspects of the present disclosure supports the designation of flows of information traffic/packets that require mobility support, including session continuity. Traffic/packet flows that require session continuity (e.g., real-time voice or video call content) may be communicated using a network path through nodes that provide IP mobility support, while non-real time content that may be communicated using caching (e.g., YouTube™ videos) may be forwarded through other network paths.

A network of moving things according to various aspects of the present disclosure also provides for a designation of traffic/packet tolerance of disruption of the end-to-end connection. A flow of information traffic/packets that is tolerant of a network connection that suffers disruptions in connectivity, delay, other quality aspects may be transported using the store-and-forward mechanisms of a DTN approach, and may use different paths than normal IP traffic/packet flows. The mapping packets/flow functional block 940 may, for example, operate to maintain a kind of mapping list/queue that stores a collection of information packets that are/were in the system of FIG. 9 during a particular recent period of time (e.g., the most recent one or more tens of milliseconds, the most recent one or more hundreds of millisecond, and/or the most recent one or more seconds), where each stored information packet has a corresponding mapping list/queue entry with a number of items of information such as, for example, a parameter that may be referred to herein as "current status," which may be assigned one or more values designated herein as examples of "Received," "BufferIN," "BufferOUT," and/or "Sent." The mapping list/queue entry for a packet may also include, for example, an information item such as a parameter that may be referred to herein as "classification," which may be assigned one or more values such as, for example, a "delay" parameter having values of "low", "medium", and "high;" a "delay/disruption tolerant" parameter having values of "0" and "1;" a "sec[urity]/privacy" parameter having possible values of "0", "1", "2", and "3;" a "throughput/bandwidth" parameter having possible values of "low", "medium", and "high;" an "IP mobility support" parameter having possible values of "0" and "1;" and/or a "level of redundancy" parameter having possible values of "low", "medium," and "high."

The order/discard functional block 920 of the example of FIG. 9 may provide a packet reordering process using a buffer storage in a node of a network in accordance with aspects of the present disclosure (e.g., fixed AP, mobile AP, NC, etc.). This functionality may, for example, be provided for the treatment of information traffic that is sensitive to the ordering of packets of the information traffic flow, and that is tolerant of delay/jitter. The order/discard functional block 920 is able to reorganize sequences of out-of-order packets and forward them in a desired order for communication to a next network node. The functionality of the order/discard functional block 920 may, for example, only be applied to a closed set of information traffic/packets that meets certain requirements regarding packet ordering and delay tolerance, because the process of reordering packets may delay the packets of the information traffic flow, and may overload (e.g., CPU and/or memory resources) the present system if applied to all information traffic/packet flows. The order/discard functional block 920 may, for example, operate to search in, for example, a queue of the buffer-in storage 915 (e.g., periodically in time or packet count) of packets of an incoming packet flow or stream for sequences of consecutively received packets that are out of order, to identify the correct order of the out-of-order packets, and to store the correctly ordered packets in, for example, a queue of the buffer-out storage 925. Depending on the classification of the information traffic/packet flow, for some type of information flow (e.g., video with small caching), the order/discard functional block 920 may also operate to drop particular packets (e.g., older packets that do not belong to any packet sequence stored in one of the queues of the buffer-in storage 915), because such packets are no longer useful to the endpoint consuming the information traffic/packet flow. When the order/discard functional block 920 completes the ordering of a set of two or more packets and inserts the ordered set of packets in the buffer-out storage 925, the order/discard functional block 920 may update the status of the ordered set of packets to "BufferOUT," so that the status (e.g., the location of the set of packets) of the ordered set of packets is accurately tracked. If the order/discard functional block 920 discards one or more packets because those packets are deemed "useless" (e.g., because the packets do not belong to any ordered sequence of packets in a queue), the order/discard functional block 920 may inform the mapping packets/flow functional block 940. The status of a packet that is received by the system of FIG. 9 two or more times may remain the status assigned as of the first receipt of the packet.

The schedule/route/send functional block 930 may perform scheduling of the sending of packets, using an algorithm that identifies a next packet from one of the various queues of the buffer-out storage 925, and may then select a communication path on which to send the identified packet of a packet/flow/session, using the device context information 932 and the links context information 934, which is described in further detail, below. A number of different algorithms may be used to manage the queues including, by way of example and not limitation, round robin; shortest remaining time; priority based; and first-come, first-served. The algorithm makes the best choice of the next packet to send, based on the context information available (e.g., device context and/or links context), and may employ neural network- or machine learning-based decision techniques for multidimensional input. When an identified packet is sent, the schedule/route/send functional block 930 may update the status of the identified packet in the mapping list/queue maintained by the mapping packets/flow functional block 940, to show the status as "Sent". The schedule/route/send functional block 930 may also replicate packets when needed, for example, in situations in which reliable receipt of an information flow is needed, but in which the information flow is being transported over unreliable links. Replication of packets may be performed, for example, in cases where a network node is receiving a single (e.g., aggregated) traffic flow via one communications link, and the network node is using two or more unreliable communication links to forward the received information to a next network node as two or more traffic flows. In such a case, the schedule/route/send functional block 930 of the network node may send packets of a traffic flow that requires urgency and reliability, using two or more copies sent through two or more available communication paths of a network as described herein, and all but one of the duplicates may be dropped by the receiving network node, as described above. The decision by a network node to replicate and transmit a given packet for a service, using more than one communication link, may involve a number of factors including, by way of example and not limitation, an acceptable probability or rate of loss of packets for the service, a maximum amount of packet delay for the service, and the currently observed probability/rate of packet loss and/or packet delay for the communication links currently active and available at the network node. In some situations, a node in accordance with aspects of the present disclosure may choose to activate use of a communication link/path not currently active (e.g., cellular), to provide the performance required by the service (e.g., likelihood of packet loss, packet delay, etc.) for which the packet is communicated, as an additional path via which replicated packets may be sent, or as an alternative path used alone to provide the needs of the service for which the packet is communicated.

While some information regarding links and devices may be obtained from a quasi-static characterization and mapping of a network and traffic flows/packets being carried by the network, as described herein, other information used for network operation (e.g., for performance of the functionality shown in and discussed with regard to FIGS. 1-7 and in particular, with regard to FIGS. 8 and 9) may be periodically measured and then distributed to some or all of the nodes of the network.

The illustration of FIG. 9 and the discussion above make reference to context information used by the schedule/route/send functional block 930, which is illustrated in FIG. 9 as the links context information 934 and the device context information 932.

The links context information 934 of FIG. 9 represents a number of information items and parameters that may be measured by and/or shared among nodes of a network of moving things as described herein. For example, the links context information 934 may include information items or configuration parameters used in the provision of security and/or privacy support for traffic flows. Traffic received through multiple communication paths may, for example, be aggregated to be sent over a secure connection (e.g., VPN) built over a specific communication technology to communicate with an enterprise network.

The links context information 934 may also represent information items or configuration parameters that may be used in ensuring that particular characteristics of the communication path for a flow of information traffic (e.g., throughput, delay, jitter, error rate, etc.) meet QoS and/or QoE requirements of end-users or network clients. For example, traffic received from one or more communication paths may be forwarded through multiple paths according QoS information for the end-to-end link. To meet QoS and/or QoE goals/requirements, real-time traffic (e.g., Voice over IP (VoIP) and Video on Demand (VoD)) may be routed through communication paths with relatively low delay and jitter, while information transferred as part of a file download may use communication paths having relatively higher throughput, but levels/amounts of delay or jitter that are relatively higher, and fail to support the QoS requirements of a consumer/end-user of the VoIP or VoD. In a network according to aspects of the present disclosure, various communication link/path parameters may be measured and many performance requirements may be specified for each supported service for communication of packets through the nodes and links of the network. Examples of parameters that may be measured for each communication link/path include, by way of illustration and not limitation, communication link throughput/bandwidth (e.g., kilo/mega/gigabits per second), packet delay and/or jitter (e.g., microsecond/milliseconds), error rate (e.g., errors per unit time or bits sent), probability of packet loss, link utilization, observed link reliability, network/link availability, to name just a few. Examples of performance requirements that may be specified for each service/flow of traffic include, by way of illustration and not limitation, urgency/priority (e.g., "low," "medium," "high," "emergency," "1-10", etc.); security/privacy support (e.g., "enabled," "disabled," "64-bit," "128-bit," "256-bit", etc.); packet order detection/correction (e.g., "enable," "disable"); required link reliability; required minimum throughput (e.g., kilo/mega/gigabits per second); disruption tolerance (e.g., "low," medium," "high," "maximum disruption of 5 ms./25 ms./100 ms./1 second/10 seconds", etc.); and degree of mobility support/session continuity (e.g., "low," ":medium," "high," etc.). In accordance with aspects of the present disclosure, the requirements for communication of packets/flows for a given service/flow of traffic may be considered to match with the characteristics of various communication paths/links used to carry the packets/flows when the performance requirements of the service/flow of traffic are met by a designated set of performance requirements, which may include only some or all of the example performance requirements listed above. A particular available communication link/path of a network node may meet all performance requirements of a given service/flow of traffic. However, depending upon which performance requirements of the given service/flow of traffic are not met by any one communication link/path of the available communication links/paths, one or more additional communication link(s)/path(s) may be selected to carry a portion of the given service/flow of traffic. The one or more additional communication links/paths may be selected so that, in combination those selected communication links/paths, may be used in combination with the particular communication link/path (e.g., using replication, as discussed above), so that the combination of communication links/paths meet the designated set of performance requirements for the service/flow of traffic.

The links context information 934 may also include information items or configuration parameters used in determining/controlling reliability of communications over the network. For example, information traffic flows required by the end-user/network client to be delivered with minimal or no losses need to be transported over reliable links (e.g., cellular), while other information traffic flows having less stringent reliability requirements may use links with some losses or even a DTN approach to delivery.

The links context information 934 may also include information items or configuration parameters used in the management of communication path availability. For example, as described above, a flow of information traffic received from a single communication path may be split while traversing a network of moving things. Using such information items or configuration parameters for path availability, information traffic/packets for services that require relatively greater stability in regards to network connection and sessions may be routed through paths having a relatively greater availability, while other information traffic flows may be routed through other, relatively less stable and relatively less available communication paths.

The links context information 934 may also include information items or configuration parameters used in the management of network communication path utilization. For example, information traffic flows/packets received from multiple/single paths can be forwarded through several paths based on the decision to have a balanced utilization of the connections/technologies.

The links context information 934 may also include information items or configuration parameters used in the management of network power consumption and/or operating cost. For example, information traffic flows/packets received from multiple communication paths may be aggregated over a single communication path, in order to use a communication path that is formed from links using communication technologies with low power consumption and/or low cost (e.g., Cable and Wi-Fi), avoiding communication paths that include links using, for example, cellular communication technologies.

The device context information 932 may include a number of information items and parameters that are related to various characteristics and/or capabilities of the nodes of a network of moving things as described herein. For example, the device context information 932 may include characteristics and/or capabilities related to computational capabilities/resources (e.g., processing power/speed, amount and/or types of memory, etc.) of network nodes or devices. Flows of information traffic/packets that require more processing from the nodes/devices in the communication path(s) carrying such traffic flows (e.g., processing for a Virtual Private Network (VPN), security, or buffering/ordering) may preferably be routed through communication paths that passing through nodes having relatively higher computational power. In comparison, information traffic flows/packets that require minimal or no processing (e.g., only simple forwarding at the network layer) may use network nodes/devices having relatively lower computational processing power/resources.

The device context information 932 may also include characteristics and/or capabilities related to data storage resources of network nodes/devices. For example, for traffic flows that require buffering/ordering or a DTN approach, it is important that the selected communication path(s) include network nodes/devices that have, at a minimum, an amount of storage that enables the network nodes/devices to accommodate a relatively high number of packets for short periods. In accordance with aspects of the present disclosure, each network node may be configured to provide a buffer capable of holding 100-1000 packets for each traffic flow/communication session for a period of time a few microseconds or tens of microseconds to a few milliseconds or tens of milliseconds.

The device context information 932 may also include characteristics and/or capabilities related to the ability of the network nodes/devices to support the degree of mobility required/desired by the end-users and/or clients of the network. For example, information traffic flows for some end-user and/or network client applications/activities are best supported by routing a suitable communication path, and then using that same communication path for the life/duration of the information traffic flow. In such scenarios, the information traffic flow, once routed, is require for a relatively longer period of time than information traffic flows of other end-users and/or clients. A network in accordance with various aspects of the present disclosure may employ characteristics and/or capabilities related to the ability of the network nodes/devices to support the degree of mobility required/desired by the end-users and/or clients of the network. The routing of such information traffic flows in a network as described herein may take into account the characteristics and/or capabilities related to the ability of network nodes/devices in the communication path (e.g., mobile APs in vehicles, fixed APs, and/or sensors) to support the degree of mobility required/desired by the end-user and/or network client. A communication path formed by network nodes/devices having a relatively lower degree of mobility may be used if the network node/device acting as the source of the flow of information traffic/packets also has a relatively lower degree of mobility. For example, a flow of information traffic/packets from a stopped vehicle that needs a stable connection for a relatively longer period of time would preferably be routed through a communication path formed from network nodes/devices that are fixed in location and/or mobile nodes/devices that are stopped. However, a network node/device having a relatively higher degree of mobility may best be served using a communication path formed by network nodes/devices having a relatively higher degree of mobility.

The device context information 932 may also include characteristics and/or capabilities related to the reliability of network nodes/devices used to support the flows of information traffic/packets of the end-users and/or clients of the network. For example, a flow of information traffic/packets that needs to be delivered with minimum losses would preferably use a communication path that includes network nodes/devices that are powered-up or "on" most or all of the time (e.g., fixed APs or mobile APs located in vehicles such as taxis, buses, trains, and autonomous vehicles that are operating most of the time), while a flow of information traffic/packets that is delay and/or loss tolerant may instead use a communication path that includes, for example, network nodes/devices that are powered up or "on" for possibly short time periods (e.g., a private automobile, a delivery van, or other vehicle that is operated for relatively shorter periods of time).

The device context information 932 may also include characteristics and/or capabilities related to the stability/availability of network nodes/devices used to support the flows of information traffic/packets in a network as described herein. For example, flows of information traffic/packets that require a relatively higher degree of stability/availability in regards to communication connections and sessions would preferably use a communication path that include network nodes/devices located in vehicles with a similar mobility pattern, and that use fixed elements of the network infrastructure (e.g., fixed APs, NC, etc.) or even a cellular communication technology connection, in order to ensure that the network nodes/devices forming the communication path will be in range for the maximum amount of time possible. In contrast, other types of information traffic flows (e.g., those that need a relatively lower degree of stability/availability in regards to communication connections and sessions) may, for example, use network nodes/devices located in, for example, a vehicle that may be traveling in another direction from the end-user/network client, power-down (i.e., turn off) unpredictably and/or multiple times, or even use communication paths using a DTN approach.

The device context information 932 may also include characteristics and/or capabilities related to power constraints and/or operating costs of network nodes/devices used to support the flows of information traffic/packets in a network as described herein. For example, flows of information traffic/packets received from multiple communication paths may be aggregated into a single communication path that includes only network nodes/devices connected to a public/commercial/mains power source instead of using communication paths that includes network nodes/devices that are provided operating power provided by limited/charged power sources.

Figure 10A:
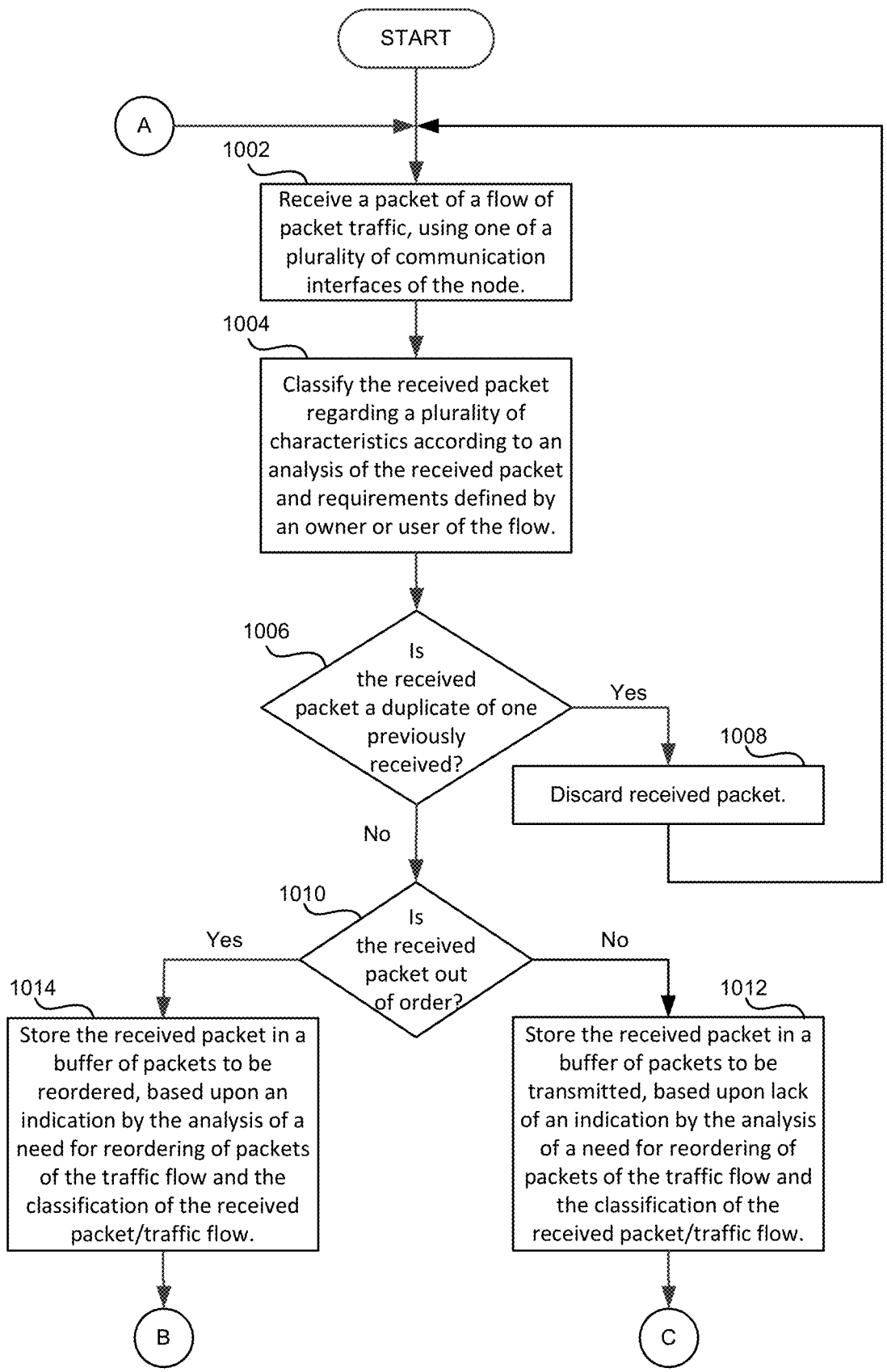
FIGS. 10A-10C illustrate a flowchart showing steps of an example managing communication of data packets by a node of a plurality of nodes of a network of moving things using a plurality of heterogeneous communication links, in accordance with various aspects of the present disclosure.
Figure 10B:
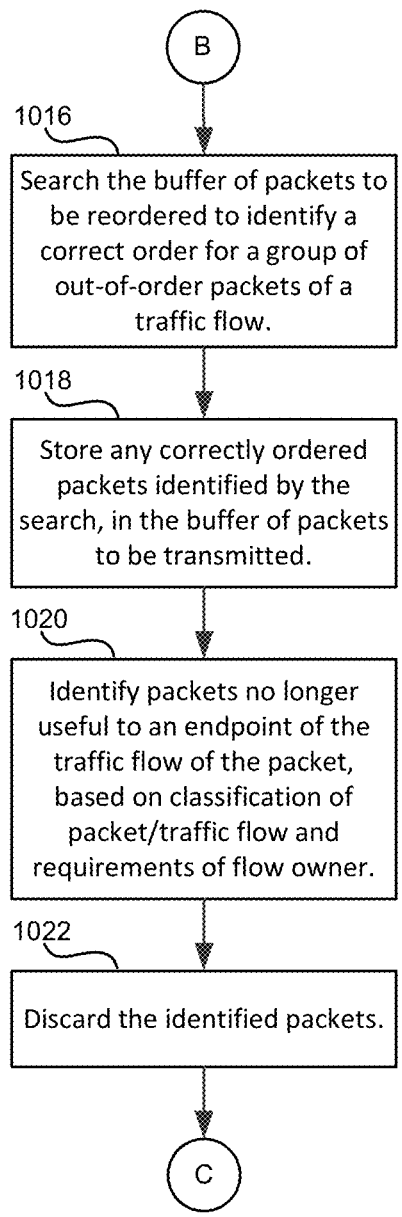
Figure 10C:
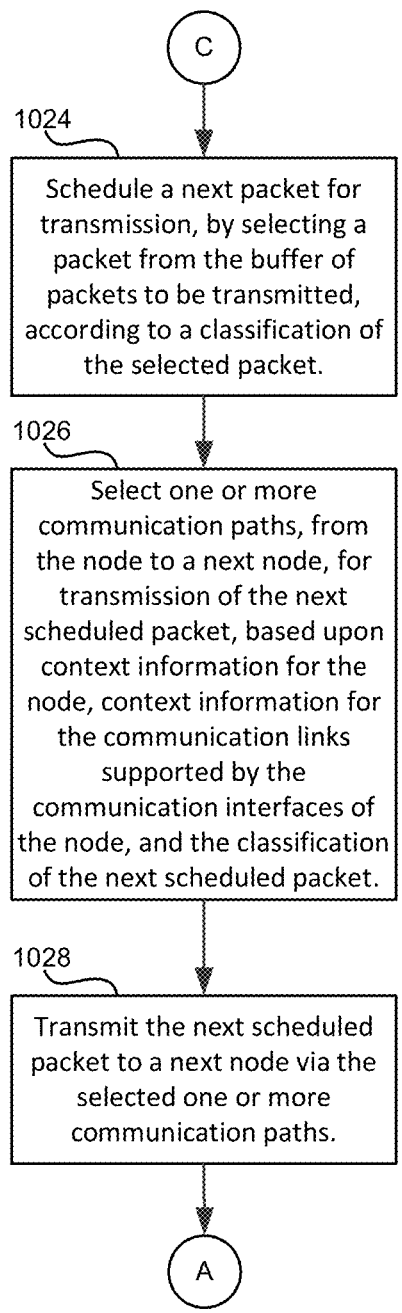

FIGS. 10A-10C illustrate a flowchart 1000 showing steps of an example method of managing communication of data packets by a node of a plurality of nodes of a network of moving things using a plurality of heterogeneous communication links, in accordance with various aspects of the present disclosure. The method of FIGS. 10A-10C may be performed by, for example, a fixed AP, mobile AP, an NC, etc., as described above and shown in FIGS. 1-9. The example method of FIGS. 10A-10C is for illustrative purposes, and other aspects of the present disclosure may be included, or some omitted, or some steps reordered, without departing from the scope and spirit of the present disclosure. The following discussion of FIGS. 10A-10C may make reference to the elements of FIGS. 1-9. The method of FIGS. 10A-10C begins at block 1002 or FIG. 10A.

At block 1002, a network node performing the method may receive a packet of a flow of packet traffic from a source node to a destination node, using one of a plurality of communication interfaces of the node. Each such communication interface may be compliant with one or more wired (e.g., an Ethernet or (e.g., IEEE 802.3), optical fiber, other "wired" communication technology) and/or wireless (e.g., Wi-Fi (e.g., IEEE 802.11a/b/g/n/ac/ad/af), Bluetooth® (e.g., IEEE 802.15.1), Zigbee® (e.g., IEEE 802.15.4), cellular (e.g., Global System for Mobile Communication (GSM), Time Division Multiple Access (TDMA), Code Division Multiple Access (CDMA), 3G, 4G, 5G, LTE, etc.), Dedicated Short Range Communication (DSRC) (e.g., 802.11p), optical air interface, or other suitable wireless) communication technology standards. A flow of traffic may, for example, comprise one or more packets communicated from an originating source endpoint to a destination endpoint.

Next, at block 1004, the node may classify the received packet/traffic flow according to an analysis of the received packet of the flow of traffic and requirements of the owner of the packet flow. Such an analysis may determine a degree of presence of various characteristics of the packets or flow, and/or the requirements of the owner/client/or end-user of the packet flow, as described in the present disclosure.

At block 1006, the method may determine whether the received packet is a duplicate of a packet received earlier. Packets sent from node to node in a network of moving things according to the present disclosure may be replicated over multiple communication links to, for example, help overcome communication link conditions/characteristics that don't meet network and/or owner/client/end-user requirements such as, for example, unreliable, interference-prone, and/or disruption-prone connections. If, at block 1006, it is determined that the received packet is a duplicate/copy of a packet that was received at an earlier point in time, the method may then proceed to block 1008, where the received packet is discarded, and the method may then return to block 1002, described above. If, however, at block 1006, it is determined that the received packet is not a duplicate/copy of a packet that was received earlier, the method may proceed to block 1010, discussed below.

At block 1010, the method of FIGS. 10A-10C may determine whether the analysis indicates that the received packet was received out of a proper packet order based upon, for example, an indication by the analysis of a need for reordering of packets of the traffic flow and the classification of the received packet/traffic flow. Making certain that the order of receipt of a flow of packets by a destination node matches the order in which packets were transmitted by the source node is crucial to some packet flows, in particular, to real-time media flows (e.g., video and/or audio). If, at block 1010, the method determines that the received packet has been received "out-of-order," the method may then continue at block 1014, where the method may store the received packet in a buffer of packets to be reordered, such as the buffers-in storage 915 of FIG. 9, discussed above. The method may then proceed to block 1016 of FIG. 10B, discussed below. If, however, at block 1010, the method determines that the received packet has not been received "out-of-order," the method may continue at block 1012, where the method may store the received packet in a buffer of packets to be transmitted such as, for example, buffers-out storage 925 of FIG. 9. The method may then pass control to block 1024 of FIG. 10C, discussed below.

At block 1016 of FIG. 10B, the node performing the method may periodically search the buffer of packets to be reordered (e.g., the buffers-in storage 915 of FIG. 9), to identify a correct order for one or more groups of out-of-order packets of one or more respective traffic flows. In accordance with aspects of the present disclosure, the buffer of packets to be reordered may store packets from many different flows of packet traffic. In accordance with aspects of the present disclosure, the node may, for example, search the buffer of packets to be reordered, periodically in time, and/or each time a packet is added to the buffer of packets to be reordered, as the newly added packet may result in a correct order for a group of out-of-order packets of a flow.

Next, at block 1018, the method may store any correctly ordered packets identified by the search at block 1016, in the buffer of packets to be transmitted (e.g., the buffers-out storage 925). The buffer of packets to be transmitted may, for example, be organized as a number of queues of packets awaiting transmission to a next node of the traffic flow, and each queue of the buffer of packets to be transmitted may correspond to the packets of a particular packet traffic flow.

At block 1020, the method of FIGS. 10A-10C may identify, in the buffer of packets to be reordered and/or the buffer of packets to be transmitted, packets that are no longer useful to the endpoint (destination) of the traffic flow of the packet, based on classification of packet/traffic flow and requirements of flow owner. For example, the loss of a packet of a flow may leave one or more packets waiting in the buffer of packets to be reordered (waiting for the arrival of the missing packet), which may never arrive. At some point in time, such waiting packets may no longer be useful to the end-point of the flow of packets, because the content of such packets can no longer be used. The method of FIGS. 10A-10C may identify such packets, at block 1020.

Next, at block 1022, the method may discard any such packets identified at block 1020. Such storage may be freed to be used for packets received later. The method may then proceed to block 1024 of FIG. 10C.

At block 1024 of FIG. 10C, the node performing the method of FIGS. 10A-10C may schedule a next packet for transmission, by selecting a packet from the buffer of packets to be transmitted (e.g., the buffers-out storage 925 of FIG. 9), according to a classification of the selected packet and a scheduling algorithm such as, by way of example and not limitation, round robin; shortest remaining time; priority based; and first-come, first-served, to name just a few example scheduling algorithms. The scheduling may take into account the requirements or conditions specified by the owner/client/end-user of each traffic flow having packets in the buffer of packets to be transmitted. In accordance with aspects of the present disclosure, the buffer of packets to be transmitted may, for example, be organized as a plurality of queues characterized by a classification (e.g., the classification of the analysis of each received packet, described above) of packets stored in each queue.

Next, at block 1026, the method of FIGS. 10A-10C may select one or more communication paths, from the node to a next node, for transmission of the next scheduled packet. The selection may, for example, be based upon context information for the node (e.g., device context 932 of FIG. 9, discussed above), context information for the communication links currently supported by the communication interfaces of the node (e.g., link context 934 of FIG. 9, discussed above), the classification of the next scheduled packet (e.g., the classification from the analysis of the next scheduled packet, when it was received by the node), and one or more conditions/requirements of the owner/client/end-user on the traffic flow of the next scheduled packet. As part of selection of one or more communication paths, the method may, at block 1026, choose to employ two or more different communication paths for the transmission of the next scheduled packet. Each of the selected communication paths may employ a corresponding communication interface using a communication technology, which may, for example, use a same or different communication medium (e.g., wired (e.g., electrical or optical) or wireless (e.g., radio frequency or optical)); a same or different frequency or wavelength or set of frequencies or wavelengths; a same or different coding; a same or different modulation; same or different data rates; and/or a same or different physical arrangement/orientation of transmitting and receiving antennas. The node may choose to employ two or more communication paths because, for example, none of the available communication interfaces of the node can currently, on its own, provide a communication path that meets one or more of the requirements/conditions of the owner/client/end-user of the flow of packets to be communicated via the communication interface(s). For example, the node may continuously monitor node context and link context information while idle, and/or during reception and transmission of data packets. If an owner/client/end-user requires that packets of a flow arrive with a reliability of, e.g., 98%, and the monitoring shows that no single communication interface of the node can support a communication link that presently provides that degree of reliability, the node may, in accordance with various aspects of the present disclosure, choose to use a combination of two or more communication interfaces and/or configurations that, when used together to transmit replicated copies of the next scheduled packet, are able to provide the required reliability over all communication path conditions (e.g., changes in wireless propagation, interference, delay, etc.) now being experienced. For example, the node may find that a combination comprising a currently available Wi-Fi path and a DSRC path supports the requirements/conditions set for transmission of packets of a traffic flow of the next scheduled packet. At a later point in time, the node may find that a single communication path is adequate, or that three communication paths are needed, depending on the links context, node/device context, analysis of the received packet that is the next scheduled packet, and the requirements/conditions set by the owner/client/end-user of the next scheduled packet for transmission to the next node. It should be noted that the specifics of the communication links used to communicate, to a next node, each packet received by a particular node, may be different, as wired and wireless network conditions change, as mobile nodes move within the service areas of the wireless networks by which they are served, and move relative to one another.

At block 1028, the node performing the method of FIGS. 10A-10C may then transmit the next scheduled packet to the next node via the one or more communication paths configured as selected at block 1026. The node performing the method of FIGS. 10A-10C may then continue at block 1002, discussed above.

In accordance with various aspects of the present disclosure, a network node/device may be aware of the communication paths and their characteristics during the process of gathering and distributing context information. Such a network node/device may also merge that context information with its own measurements/metrics in order to provide new communication paths, in situations in which the network node/device is the first hop to the Internet.

A network in accordance with various aspects of the present disclosure may use various ways of distributing and gathering context information to feed decisions about communication paths. In a distributed system for a network of moving things according to various aspects of the present disclosure, each given network node/device may receive information identifying all of the available communication paths and their respective characteristics from network neighbors of the given network node/device, and may then introduce its own metrics for new communication paths for which the network node/device is now the first hop. In this way, the given network node/device may distribute the new communication path information that it can provide to its neighbors, thereby providing a distributed way to provide to the network neighbors all communication paths of which the given nodes/device is aware, based on the overall characteristics and/or a score of the communication paths.

In a centralized system for a network of moving things according to various aspects of the present disclosure, each network node/device may provide its own local measurements to a centralized entity, so that this central network node/device entity has a full view of the connections and characteristics of the entire network. In this way, a given network node/device may request information for any and/or all of the available communication paths and their respective characteristics, from the central network node/device, before performing any analysis or making any decisions regarding the routing of new traffic flows.

In accordance with various aspects of the present disclosure, there is also the possibility of having a mix of both the distributed and the centralized approaches described above. In such an arrangement, the centralized device may be present, and may perform selection of some mobile devices (e.g., mobile APs) to be local network nodes with information about communication paths of neighboring network nodes/devices. In this way, when there is a local network node with information about the communication paths of the network, the local network node may provide that information to its own neighboring network nodes. Alternatively, the neighboring network node/device may gather/retrieve that communication path information from the centralized device.

Independently of using a distributed or centralized approach to access the context information described above, a publish/subscribe schema may also be adopted to gather the context information from neighboring nodes/devices and/or from the centralized network node/device. When using a distributed approach, a network node/device may, for example, act as a subscriber to its neighboring nodes, so that when a relevant change in the communication paths provided by the neighboring network nodes/devices take place, the neighboring network nodes/devices publish a message to the subscribing network node/device, with new information about the communication paths. In the case of a centralized approach, the network nodes/devices may, for example, subscribe directly to the neighboring network nodes/devices from which they want to receive communication path information. In this way, the centralized network node/device may publish communication path information to the subscribing network nodes/devices when there are changes in the communication paths associated with that neighboring network node/device.

In a network in accordance with aspects of the present disclosure, the way in which information is provided to neighboring network nodes/devices may depend on the methods and mechanisms in use. The method of using broadcast mechanisms may involve network nodes/devices distributing their link context information and/or their device context information (e.g., characteristics and capabilities) periodically or upon detection or notification of changes in such information. In this way, every network node/device may receive updated information about the available communication links with which to send traffic to the Internet. It should be noted that, while it is preferable to perform decisions regarding network traffic flow routing based on fresh information about available communication links; such update activity may increase the network information traffic load. However, instead of broadcasting all of the information about available communication links, each network node/device may provide the information about available communication links based on received requests, so that replies are event-triggered. Depending on the frequency of the requests, this solution may reduce the information traffic load involved in the communication of the information about available communication links. If there is a high frequency of requests, this approach may, however, generate more network message traffic than the broadcast solution, since there will be a separate request message for each neighbor requesting the same information.

A network of moving things according to various aspects of the present disclosure provides a number of benefits, using multiple mobile devices with multiple communication links using the same or different communication technologies, in a constantly changing communication landscape. The heterogeneous and highly mobile environment of the present disclosure includes the appropriate mechanisms to maximize the benefits from the available communication links via the aggregation and/or splitting of information traffic flows. A network in accordance with aspects of the present invention provides increased overall available bandwidth of a vehicular network (i.e., an "Internet of Moving Things"), by exploiting all available communication connections and paths. Such a network may reduce/remove bottlenecks by using on-demand management of traffic flows over different communication paths according to current network conditions. Aspects of the present disclosure provide improved QoS/QoE to the overall traffic flow of the network, resulting from the individualized treatment of traffic flows. Customized/personalized traffic flow decisions adjust the flow of information traffic to the available communication paths/connections. A network according to aspects of the present disclosure operates with reduced network data transport costs, while providing mobility on-demand and delay tolerant transport for session-disruption and delay tolerant traffic, respectively. A network according to aspects of the present disclosure makes communications over unreliable communication links more reliable using fallback connections and/or copies of packets transmitted over one or more communication links using the same or different communication technologies.

A network of moving things in accordance with aspects of the present disclosure may employ algorithms using machine learning techniques to improve decisions regarding aggregation and/or splitting of traffic flows, based upon context information that is acquired in real time. Aspects of the present disclosure support the use of a transport protocol that enables network operation expected for an Internet of moving things.

Aspects of the present disclosure may be seen in a method of managing communication of data packets by a node of a plurality of nodes of a network of moving things using a plurality of heterogeneous communication links. Such a method may comprise receiving a packet of a flow of packets from a source node to a destination node, from one of a plurality of communication interfaces of the node; classifying the received packet with regard to one or more packet characteristics and with regard to one or more requirements defined for the flow of packets; and storing the received packet in a first buffer or in a second buffer, according to the order of the received packet in the flow of packets. The method may also comprise scheduling, from the second buffer, a next packet for transmission by the node towards the destination node, based upon the classifying; selecting one or more communication interfaces from the plurality of communication interfaces, according to respective context information for communication links formed using the plurality of communication interfaces; and transmitting the next packet for transmission by the node to a next node in a path towards the destination node, using the selected one or more communication interfaces.

In a method according to aspects of the present disclosure, storing the received packet may comprise transferring a correctly ordered group of packets from the first buffer to the second buffer, based upon the order of the received packet in the flow of packets; and transmitting the next packet for transmission may comprise sending the next packet for transmission to the next node via each of the selected one or more communication interfaces. The method may further comprise deleting a packet from the first buffer or from the second buffer, based upon the one or more requirements defined for the flow of packets; where deleting a packet from the first buffer or from the second buffer may comprise determining whether the packet is currently of use to the destination node. The requirements defined for the flow of packets may comprise a measure of successful packet delivery from the source node to the destination node and an amount of delay in delivery of a packet; and selecting one or more communication interfaces from the plurality of communication interfaces may comprise selecting two or more communication interfaces based on the respective context information for communication links formed using the plurality of communication interfaces. Selecting two or more communication interfaces may comprise determining that the plurality of communication interfaces fail to individually meet at least one of the requirements defined for the flow of packets.

Additional aspects of the present disclosure may be found in a non-transitory computer-readable medium comprising a plurality of code sections, wherein each code section comprises a plurality of instructions executable by one or more processors. The instructions may cause the one or more processor to perform the actions of a method of managing communication of data packets by a node of a plurality of nodes of a network of moving things using a plurality of heterogeneous communication links, where the actions of the method may be as described above.

Further aspects of the present disclosure may be observed in a system for managing communication of data packets by a node of a plurality of nodes of a network of moving things using a plurality of heterogeneous communication links. Such a system may comprise one or more processors configured to communicatively couple to other nodes of the plurality of nodes, where the one or more processor may be operable to, at least, perform the actions of a method such as that described above.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222, 077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of managing communication of data packets by a node of a plurality of nodes of a network of moving things using a plurality of heterogeneous communication links, the method comprising:
   receiving a packet of a flow of packets from a source node to a destination node, from one of a plurality of communication interfaces of the node;
   processing the received packet, wherein the processing comprises:
      classifying the received packet with regard to one or more packet and with regard to one or more requirements defined for the flow of packets;

dropping the received packet based on a determination that the received packet is a duplicate of a previously received packet; and when the received packet is not a duplicate of a previously received packet, storing the received packet in one of a first buffer or a second buffer, wherein the storing comprises:
determining order of the received packet in the flow of packets,
when the received packet is received out-of-order, storing the received packet in the first buffer, and
when the received packet is not received out-of-order, storing the received packet in the second buffer;

scheduling, from the second buffer, a next packet for transmission by the node towards the destination node, based upon the classifying;

selecting one or more communication interfaces from the plurality of communication interfaces, according to respective context information for communication links formed using the plurality of communication interfaces; and transmitting the next packet for transmission by the node to a next node in a path towards the destination node, using the selected one or more communication interfaces.

2. The method according to claim 1, wherein storing the received packet comprises transferring a correctly ordered group of packets from the first buffer to the second buffer, based upon the order of the received packet in the flow of packets.

3. The method according to claim 1, wherein transmitting the next packet for transmission comprises sending the next packet for transmission to the next node via each of the selected one or more communication interfaces.

4. The method according to claim 1, the method further comprising:
deleting a packet from the first buffer or from the second buffer, based upon the one or more requirements defined for the flow of packets.

5. The method according to claim 4, wherein deleting a packet from the first buffer or from the second buffer comprises:
determining whether the packet is currently of use to the destination node.

6. The method according to claim 1, wherein the requirements defined for the flow of packets comprise a measure of successful packet delivery from the source node to the destination node and an amount of delay in delivery of a packet.

7. The method according to claim 1, wherein the selecting of the one or more communication interfaces from the plurality of communication interfaces comprises selecting two or more communication interfaces based on the respective context information for communication links formed using the plurality of communication interfaces.

8. The method according to claim 7, wherein the selecting of the two or more communication interfaces comprises determining that the plurality of communication interfaces fail to individually meet at least one of the requirements defined for the flow of packets.

9. A non-transitory computer-readable medium comprising a plurality of code sections, wherein each code section comprises a plurality of instructions executable by one or more processors, the instructions causing the one or more processor to perform the actions of a method of managing communication of data packets by a node of a plurality of nodes of a network of moving things using a plurality of heterogeneous communication links, the actions of the method comprising:

receiving a packet of a flow of packets from a source node to a destination node, from one of a plurality of communication interfaces of the node;

processing the received packet, wherein the processing comprises:
classifying the received packet with regard to one or more packet characteristics and with regard to one or more requirements defined for the flow of packets;
dropping the received packet based on a determination that the received packet is a duplicate of a previously received packet; and
when the received packet is not a duplicate of a previously received packet, storing the received packet in one of a first buffer or a second buffer, wherein the storing comprises:
determining order of the received packet in the flow of packets,
when the received packet is received out-of-order, storing the received packet in the first buffer, and
when the received packet is not received out-of-order, storing the received packet is stored in the second buffer;

scheduling, from the second buffer, a next packet for transmission by the node towards the destination node, based upon the classifying;

selecting one or more communication interfaces from the plurality of communication interfaces, according to respective context information for communication links formed using the plurality of communication interfaces; and transmitting the next packet for transmission by the node to a next node in a path towards the destination node, using the selected one or more communication interfaces.

10. The non-transitory computer-readable medium according to claim 9, wherein storing the received packet comprises transferring a correctly ordered group of packets from the first buffer to the second buffer, based upon the order of the received packet in the flow of packets.

11. The non-transitory computer-readable medium according to claim 9, wherein transmitting the next packet for transmission comprises sending the next packet for transmission to the next node via each of the selected one or more communication interfaces.

12. The non-transitory computer-readable medium according to claim 9, the method further comprising:
deleting a packet from the first buffer or from the second buffer, based upon the one or more requirements defined for the flow of packets.

13. The non-transitory computer-readable medium according to claim 12, wherein deleting a packet from the first buffer or from the second buffer comprises:
determining whether the packet is currently of use to the destination node.

14. The non-transitory computer-readable medium according to claim 9, wherein the requirements defined for the flow of packets comprise a measure of successful packet delivery from the source node to the destination node and an amount of delay in delivery of a packet.

15. The non-transitory computer-readable medium according to claim 9, wherein the selecting of the one or more communication interfaces from the plurality of communication interfaces comprises selecting two or more communication interfaces based on the respective context information for communication links formed using the plurality of communication interfaces.

16. The non-transitory computer-readable medium according to claim 15, wherein the selecting of the two or more communication interfaces comprises determining that the plurality of communication interfaces fail to individually meet at least one of the requirements defined for the flow of packets.

17. A system for managing communication of data packets by a node of a plurality of nodes of a network of moving things using a plurality of heterogeneous communication links, the system comprising:
  one or more processors configured to communicatively couple to other nodes of the plurality of nodes, the one or more processor operable to, at least:
    receive a packet of a flow of packets from a source node to a destination node, from one of a plurality of communication interfaces of the node;
    process the received packet, wherein the processing comprises:
      classifying the received packet with regard to one or more packet characteristics and with regard to one or more requirements defined for the flow of packets;
      dropping the received packet based on a determination that the received packet is a duplicate of a previously received packet; and
    select one of a first buffer or a second buffer to store the received packet, wherein:
      when the received packet is not a duplicate of a previously received packet, storing the received packet in one of a first buffer or a second buffer, wherein the storing comprises:
        determining order of the received packet in the flow of packets,
        when the received packet is received out-of-order, storing the received packet in the first buffer, and
        when the received packet is not received out-of-order, storing the received packet in the second buffer;
    schedule, from the second buffer, a next packet for transmission by the node towards the destination node, based upon the classifying;
    select one or more communication interfaces from the plurality of communication interfaces, according to respective context information for communication links formed using the plurality of communication interfaces; and
    transmit the next packet for transmission by the node to a next node in a path towards the destination node, using the selected one or more communication interfaces.

18. The system according to claim 17, wherein storing the received packet comprises transferring a correctly ordered group of packets from the first buffer to the second buffer, based upon the order of the received packet in the flow of packets.

19. The system according to claim 17, wherein transmitting the next packet for transmission comprises sending the next packet for transmission to the next node via each of the selected one or more communication interfaces.

20. The system according to claim 17, the method further comprising:
  deleting a packet from the first buffer or from the second buffer, based upon the one or more requirements defined for the flow of packets.

21. The system according to claim 20, wherein deleting a packet from the first buffer or from the second buffer comprises:
  determining whether the packet is currently of use to the destination node.

22. The system according to claim 17, wherein the requirements defined for the flow of packets comprise a measure of successful packet delivery from the source node to the destination node and an amount of delay in delivery of a packet.

23. The system according to claim 17, wherein the selecting of the one or more communication interfaces from the plurality of communication interfaces comprises selecting two or more communication interfaces based on the respective context information for communication links formed using the plurality of communication interfaces.

24. The system according to claim 23, wherein the selecting of the two or more communication interfaces comprises determining that the plurality of communication interfaces fail to individually meet at least one of the requirements defined for the flow of packets.

* * * * *